US009621665B2

(12) United States Patent
Guo

(10) Patent No.: US 9,621,665 B2
(45) Date of Patent: Apr. 11, 2017

(54) MULTIMEDIA REDIRECTION METHOD, MULTIMEDIA SERVER, AND COMPUTER SYSTEM

(71) Applicant: Huawei Technologies Co., Ltd., Shenzhen (CN)

(72) Inventor: Yan Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/728,690

(22) Filed: Jun. 2, 2015

(65) Prior Publication Data

US 2015/0264149 A1 Sep. 17, 2015

Related U.S. Application Data

(63) Continuation of application No. PCT/CN2012/086117, filed on Dec. 7, 2012.

(51) Int. Cl.
*G06F 15/16* (2006.01)
*H04L 29/08* (2006.01)
(Continued)

(52) U.S. Cl.
CPC .... *H04L 67/2814* (2013.01); *G06F 17/30038* (2013.01); *H04L 65/4069* (2013.01);
(Continued)

(58) Field of Classification Search
USPC .......................................................... 709/227
See application file for complete search history.

(56) References Cited

U.S. PATENT DOCUMENTS 7,483,945 B2 * 1/2009 Blumofe ............. H04L 12/1818
379/201.12
7,624,337 B2 * 11/2009 Sull ................... G06F 17/30796
715/201
(Continued)

FOREIGN PATENT DOCUMENTS

CN 101410803 A 4/2009
CN 101582926 A 11/2009
(Continued)

OTHER PUBLICATIONS

Foreign Communication From a Counterpart Application, PCT Application No. PCT/CN2012/086117, English Translation of International Search Report dated Sep. 19, 2013, 2 pages.
(Continued)

*Primary Examiner* — Alicia Baturay
(74) *Attorney, Agent, or Firm* — Conley Rose, P.C.

(57) ABSTRACT

A multimedia redirection method, a multimedia server, and a computer system. The method includes: receiving a virtual-desktop login request of a user, where the virtual-desktop login request includes an identifier of the user; acquiring, according to the identifier of the user, metadata of a multimedia instance that is not shut down by the user before a last disconnection, where the metadata includes path information of a multimedia file corresponding to the multimedia instance; and sending the metadata to a client of the user so that the client acquires, according to the metadata, multimedia data corresponding to the metadata and plays the multimedia data. The adoption of technical solutions of the present invention can implement that multimedia that is not closed before a last disconnection may be automatically played when a user logs in again, thereby improving experience of multimedia application of the user.

18 Claims, 8 Drawing Sheets

(51) Int. Cl.
  *H04L 29/06* (2006.01)
  *G06F 17/30* (2006.01)
  *H04N 21/258* (2011.01)
  *H04N 21/262* (2011.01)
(52) U.S. Cl.
  CPC ....... *H04L 67/02* (2013.01); *H04N 21/25866* (2013.01); *H04N 21/25875* (2013.01); *H04N 21/26258* (2013.01); *H04L 67/145* (2013.01)

(56) References Cited

U.S. PATENT DOCUMENTS

| | | | | |
|---|---|---|---|---|
| 7,640,303 B2 * | 12/2009 | Blumofe | ............. | H04L 12/1818 379/201.12 |
| 7,823,055 B2 * | 10/2010 | Sull | ................... | G06F 17/30796 715/201 |
| 7,904,529 B2 * | 3/2011 | Azulai | ................ | H04L 65/4092 709/204 |
| 8,705,933 B2 * | 4/2014 | Eyer | ........................ | H04N 5/76 386/241 |
| 9,003,309 B1 * | 4/2015 | Venkateshamurthy | | G06F 17/2247 715/760 |
| 2004/0193683 A1* | 9/2004 | Blumofe | ............. | H04L 12/1818 709/204 |
| 2007/0033170 A1* | 2/2007 | Sull | ................... | G06F 17/30796 |
| 2007/0033292 A1* | 2/2007 | Sull | ................... | G06F 17/30796 709/238 |
| 2007/0033515 A1* | 2/2007 | Sull | ................... | G06F 17/30796 715/202 |
| 2007/0033521 A1* | 2/2007 | Sull | ................... | G06F 17/30796 715/202 |
| 2007/0033533 A1* | 2/2007 | Sull | ................... | G06F 17/30796 715/752 |
| 2007/0038612 A1* | 2/2007 | Sull | ................... | G06F 17/30796 |
| 2007/0174429 A1 | 7/2007 | Mazzaferri et al. | | |
| 2010/0131654 A1 | 5/2010 | Malakapalli et al. | | |
| 2012/0066607 A1* | 3/2012 | Song | ..................... | G06F 9/5077 715/737 |
| 2012/0066679 A1* | 3/2012 | Pappas | ................ | G06F 9/45558 718/1 |
| 2012/0078720 A1* | 3/2012 | Pappas | ..................... | G06F 8/38 705/14.55 |
| 2013/0226979 A1* | 8/2013 | Caruso | .................. | H04L 65/605 707/827 |

FOREIGN PATENT DOCUMENTS

| | | |
|---|---|---|
| CN | 101820535 A | 9/2010 |
| CN | 102196313 A | 9/2011 |
| CN | 102761603 A | 10/2012 |
| WO | 2012037076 A1 | 3/2012 |

OTHER PUBLICATIONS

Foreign Communication From a Counterpart Application, PCT Application No. PCT/CN2012/086117, English Translation of Written Opinion dated Sep. 19, 2013, 6 pages.
Foreign Communication From a Counterpart Application, PCT Application No. PCT/CN2012/086117, International Search Report dated Sep. 19, 2013, 3 pages.
Foreign Communication From a Counterpart Application, PCT Application No. PCT/CN2012/086117, Written Opinion dated Sep. 19, 2013, 5 pages.
Foreign Communication From a Counterpart Application, Chinese Application No. 201280002883.9, Chinese Office Action dated Jul. 25, 2016, 4 pages.
Foreign Communication From a Counterpart Application, Chinese Application No. 201280002883.9, Chinese Search Report dated Jul. 13, 2016, 2 pages.

* cited by examiner

MULTIMEDIA REDIRECTION METHOD, MULTIMEDIA SERVER, AND COMPUTER SYSTEM

CROSS-REFERENCE

This application is a continuation of International Application No. PCT/CN2012/086117, filed on Dec. 7, 2012, which is hereby incorporated by reference in its entirety.

TECHNICAL FIELD

The present invention relates to the computer field, and in particular, to a multimedia redirection method and a multimedia server.

BACKGROUND

With the development of computer technologies and network popularization, remote desktop technologies have found increasingly wide application in current enterprise office environments. In the remote desktop technologies, specifically, content displayed on a computer screen is transferred through a network to another remote display in the network for displaying. For example, a Microsoft Windows system provides a remote login program, mstsc.exe, which is a common remote desktop program.

With the rapid development of cloud computing technologies and the popularization of the application of the cloud computing technologies, the cloud computing technologies bring new development opportunities for application of a remote desktop. People increasingly apply remote desktop technologies to virtual machines in a cloud computing system; in this way, people can separately apply, to local clients, applications on virtual machines by means of the remote desktop technologies, thereby implementing full application of the cloud computing system.

For network application, in the remote desktop technologies, an end where a user is located is marked as a client, and an end (which may be, but is not limited to a virtual machine) where each application program is practically located is a server configured to provide a service for the user. Each client applies an application on each server by applying a virtual remote desktop technology as conveniently as a user applies a program on a local client so that user experience is significantly improved.

With the development of the remote desktop technologies and the increase of multimedia application demands of people, the remote desktop technologies are not only limited to remote screen displaying, and further include remote sound transfer and the like.

In a practical application in a network, server and network bandwidth resources are limited. If the CPU usage of a server is excessively high, the server easily becomes busy, in which case the server responds to an application of each client at an excessively low speed, or even the server may crash because of excessive applications, affecting use experience of a user. In addition, if the server sends an excessively large amount of network data to each client, network congestion also occurs easily. Data processing of multimedia information (for example, conventional multimedia data and flash multimedia data) and multimedia network transmission occupy major resources (central processing unit (CPU) and network resources).

A multimedia redirection technology is a network application technology mainly for solving technical problems such as a CPU overload of a server and an excessive amount of network data. In the redirection technology, a client mainly sends a data stream of an original undecoded media file (whose data packet is much less than that of decoded data) to a client by using a virtual remote desktop technology, and decoding (or data processing of stream media before playing) and playing are performed at the client rather than at a server end, thereby significantly reducing CPU usage of a server and occupation of network bandwidth.

Flash is a specific type of multimedia data, flash redirection thereof is specifically that: when a browser at a server end plays flash content, a server captures the flash content, sends a data stream corresponding to the captured flash content to a client, and redirects the data stream to the client so that rendering of the flash content is performed in a window of the client instead of at the server end, thereby reducing CPU usage of the server end and occupation of network bandwidth.

By using flash redirection as an example, in a processing manner of flash redirection in the prior art, after a user logs in to a server by means of a network by using a remote desktop technology, opens a browser on the server, and opens a web page having flash multimedia content, the server triggers a flash redirection process according to the opening of the browser. Flash redirection processing is implemented so that the user implements flash playing on a client.

In a research process of the present invention, the prior art at least has the following defects.

By using flash redirection as an example, in an existing flash redirection technology, when a client logs in to a virtual desktop again to use a virtual-desktop service after a last disconnection, if a multimedia instance that is not shut down exists before the last disconnection, non-flash content such as a blank or a black screen is presented in a window of the client, causing loss of flash content, resulting in great inconvenience to application performed by a user, and affecting practical application performed by the user.

SUMMARY

A first objective of embodiments of the present invention is to provide a multimedia redirection method. The application of this technical solution can implement that multimedia that is not closed before a last disconnection may be automatically played when a user logs in again, thereby improving experience of multimedia application of the user.

A second objective of the embodiments of the present invention is to provide a multimedia redirection method. The application of this technical solution can implement that multimedia that is not closed before a last disconnection may be automatically played when a user logs in again, thereby improving experience of multimedia application of the user.

A third objective of the embodiments of the present invention is to provide a multimedia server. The application of this technical solution can implement that multimedia that is not closed before a last disconnection may be automatically played when a user logs in again, thereby improving experience of multimedia application of the user.

A fourth objective of the embodiments of the present invention is to provide a multimedia server. The application of this technical solution can implement that multimedia that is not closed before a last disconnection may be automatically played when a user logs in again, thereby improving experience of multimedia application of the user.

A fifth objective of the embodiments of the present invention is to provide a multimedia server. The application of this technical solution can implement that multimedia that is not closed before a last disconnection may be automatically played when a user logs in again, thereby improving experience of multimedia application of the user.

A sixth objective of the embodiments of the present invention is to provide a multimedia server. The application of this technical solution can implement that multimedia that is not closed before a last disconnection may be automatically played when a user logs in again, thereby improving experience of multimedia application of the user.

A seventh objective of the embodiments of the present invention is to provide a computer system. The application of this technical solution can implement that multimedia that is not closed before a last disconnection may be automatically played when a user logs in again, thereby improving experience of multimedia application of the user.

An eighth objective of the embodiments of the present invention is to provide a computer system. The application of this technical solution can implement that multimedia that is not closed before a last disconnection may be automatically played when a user logs in again, thereby improving experience of multimedia application of the user.

According to a first aspect, an embodiment of the present invention provides a multimedia redirection method, including: receiving a virtual-desktop login request of a user, where the virtual-desktop login request includes an identifier of the user; acquiring, according to the identifier of the user, metadata of a multimedia instance that is not shut down by the user before a last disconnection, where the metadata at least includes path information of a multimedia file corresponding to the multimedia instance; and sending the metadata to a client of the user so that the client acquires, according to the metadata, multimedia data corresponding to the metadata and plays the multimedia data.

With reference to the first aspect, in a first implementation manner, the step of acquiring, according to the identifier of the user, metadata of a multimedia instance that is not shut down by the user before a last disconnection includes: acquiring, according to the identifier of the user, a web page identifier of a web page on which the multimedia instance that is not shut down by the user before the last disconnection is located; and according to the web page identifier, refreshing the web page, loading the web page again, and acquiring the metadata of the multimedia instance on the web page.

With reference to the first aspect or with reference to the first implementation manner of the first aspect, in a second implementation manner, the step of acquiring, according to the identifier of the user, metadata of a multimedia instance that is not shut down by the user before a last disconnection includes performing, according to the identifier of the user, a query to acquire pre-stored metadata of the multimedia instance that is not shut down by the user before the last disconnection.

With reference to the first aspect or the first and second implementation manners of the first aspect, in a third implementation manner, the metadata of the multimedia instance further includes information about a playing window of the multimedia instance, a size of the playing window, a position of the playing window on a virtual desktop of a server, and a position of a covered region of the playing window on the virtual desktop; and after the step of sending the metadata to a client of the user, playing, by the client, the multimedia data includes creating, by the client according to the information about the playing window, the playing window at the client, and playing the multimedia data in the playing window.

With reference to the first aspect or the first and second implementation manners of the first aspect, in a fourth implementation manner, the multimedia instance is a flash instance; and the path information of the multimedia file corresponding to the multimedia instance includes path information of a flash media file corresponding to the flash instance, and, path information of a flash stream media file corresponding to the flash instance.

According to a second aspect, an embodiment of the present invention provides a multimedia redirection method, including receiving a virtual-desktop login request of a user, where the virtual-desktop login request includes an identifier of the user; acquiring, according to the identifier of the user, metadata of a multimedia instance that is not shut down by the user before a last disconnection, where the metadata at least includes a type of a multimedia file corresponding to the multimedia instance and an audio/video encoding format of the multimedia file; sending the metadata to a client so that the client creates a player and a decoder according to the type of the multimedia file and the audio/video encoding format of the multimedia file; and pushing multimedia data corresponding to the multimedia instance that is not shut down to the client so that the client decodes the multimedia data by using the decoder and plays the decoded multimedia data in the player.

With reference to the second aspect, in a first implementation manner, the metadata of the multimedia instance further includes information about a playing window of the multimedia instance, a size of the playing window, a position of the playing window on a virtual desktop of a server, and a position of a covered region of the playing window on the virtual desktop; and after the step of sending the metadata to a client, creating, by the client, the player according to the type of the multimedia file and the audio/video encoding format of the multimedia file includes: creating, by the client according to the type of the multimedia file and the audio/video encoding format of the multimedia file, the player at the client so that a playing window of the player and the playing window in the metadata have consistent information.

According to a third aspect, an embodiment of the present invention provides a multimedia server, including a receiving unit configured to receive a virtual-desktop login request of a user, where the virtual-desktop login request includes an identifier of the user; a storage unit configured to store information about a multimedia instance that is not shut down by the user before a last disconnection; a metadata reading unit configured to acquire, according to the identifier of the user, metadata of the multimedia instance that is not shut down by the user before the last disconnection, where the metadata at least includes path information of a multimedia file corresponding to the multimedia instance; and a redirection control unit configured to send the metadata to a client of the user so that the client acquires, according to the metadata, multimedia data corresponding to the metadata and plays the multimedia data.

With reference to the third aspect, in a first implementation manner, the information that is stored in the storage unit and about the multimedia instance that is not shut down by the user before the last disconnection includes a web page identifier of a web page on which the multimedia instance that is not shut down by the user before the last disconnection is located; and the metadata reading unit is configured to perform a query on the storage unit according to the identifier of the user to acquire the web page identifier of the web page on which the multimedia instance that is not shut down by the user before the last disconnection is located; and according to the web page identifier, refresh the web page, load the web page again, and acquire the metadata of the multimedia instance on the web page after the web page is loaded.

With reference to the third aspect, in a second implementation manner, the information that is stored in the storage unit and about the multimedia instance that is not shut down by the user before the last disconnection includes the metadata of the multimedia instance that is not shut down by the user before the last disconnection; and the metadata reading unit is specifically configured to perform a query on the storage unit according to the identifier of the user to acquire the metadata of the multimedia instance that is not shut down by the user before the last disconnection.

With reference to the third aspect, or with reference to the first and second implementation manners of the third aspect, in a third implementation manner, the metadata that is stored in the storage unit and of the multimedia instance further includes information about a playing window of the multimedia instance, a size of the playing window, a position of the playing window on a virtual desktop of the server, and a position of a covered region of the playing window on the virtual desktop.

According to a fourth aspect, an embodiment of the present invention provides a multimedia server, including a receiving unit configured to receive a virtual-desktop login request of a user, where the virtual-desktop login request includes an identifier of the user; a storage unit configured to store metadata of a multimedia instance that is not shut down by the user before a last disconnection, where the metadata at least includes a type of a multimedia file corresponding to the multimedia instance and an audio/video encoding format of the multimedia file; a metadata reading unit configured to perform a query on the storage unit according to the identifier of the user to acquire the metadata of the multimedia instance that is not shut down by the user before the last disconnection; and a redirection control unit configured to send the metadata to a client so that the client creates a player and a decoder according to the type of the multimedia file and the audio/video encoding format of the multimedia file, and push multimedia data corresponding to the multimedia instance that is not shut down to the client so that the client decodes the multimedia data by using the decoder and plays the decoded multimedia data in the player.

With reference to the fourth aspect, in a first implementation manner, the metadata that is stored in the storage unit and of the multimedia instance further includes information about a playing window of the multimedia instance, a size of the playing window, a position of the playing window on a virtual desktop of the server, and a position of a covered region of the playing window on the virtual desktop.

According to a fifth aspect, an embodiment of the present invention provides a multimedia server, including a receiver configured to receive a virtual-desktop login request of a user, where the virtual-desktop login request includes an identifier of the user; a memory configured to store information about a multimedia instance that is not shut down by the user before a last disconnection; a metadata reader, electrically connected to the receiver and the memory, and configured to acquire, according to the identifier of the user, metadata of the multimedia instance that is not shut down by the user before the last disconnection, and input the metadata of the multimedia instance to a redirection controller, where the metadata of the multimedia instance at least includes path information of a multimedia file corresponding to the multimedia instance; and the redirection controller configured to send the metadata of the multimedia instance to a client of the user so that the client acquires, according to the metadata of the multimedia instance, multimedia data corresponding to the multimedia instance and plays the multimedia data at the client.

With reference to the fifth aspect, in a first implementation manner, the information that is stored in the memory and about the multimedia instance that is not shut down by the user before the last disconnection includes a web page identifier of a web page on which the multimedia instance that is not shut down by the user before the last disconnection is located; and the metadata reader is configured to perform a query on the memory according to the identifier of the user to acquire the web page identifier of the web page on which the multimedia instance that is not shut down by the user before the last disconnection is located; and according to the web page identifier, refresh the web page, load the web page again, and acquire the metadata of the multimedia instance on the web page after the web page is loaded.

With reference to the fifth aspect, in a second implementation manner, the information that is stored in the memory and about the multimedia instance that is not shut down by the user before the last disconnection includes the metadata of the multimedia instance that is not shut down by the user before the last disconnection; and the metadata reader is configured to perform a query on the memory according to the identifier of the user to acquire the metadata of the multimedia instance that is not shut down by the user before the last disconnection.

With reference to the second implementation manner of the fifth aspect, in a third implementation manner, the metadata that is stored in the memory and of the multimedia instance further includes information about a playing window of the multimedia instance, a size of the playing window, a position of the playing window on a virtual desktop of the server, and a position of a covered region of the playing window on the virtual desktop.

According to a sixth aspect, an embodiment of the present invention provides a multimedia server, including a receiver configured to receive a virtual-desktop login request of a user, where the virtual-desktop login request includes an identifier of the user; a memory configured to store metadata of a multimedia instance that is not shut down by the user before a last disconnection, where the metadata of the multimedia instance at least includes a type of a multimedia file corresponding to the multimedia instance and an audio/video encoding format of the multimedia file; a metadata reader, electrically connected to the receiver and the memory separately, and configured to perform a query on the memory according to the identifier of the user to acquire the metadata of the multimedia instance that is not shut down by the user before the last disconnection, and input the metadata of the multimedia instance to a redirection controller; and the redirection controller configured to send the metadata of the multimedia instance to a client, and push multimedia data corresponding to the multimedia instance that is not shut down to the client so that the client creates a player and a decoder according to the type of the multimedia file and the audio/video encoding format of the multimedia file, decodes the multimedia data by using the decoder, and plays the decoded multimedia data in the player.

With reference to the sixth aspect, in a first implementation manner, the metadata that is stored in the memory and of the multimedia instance further includes information about a playing window of the multimedia instance: a size of the playing window, a position of the playing window on a virtual desktop of the server, and a position of a covered region of the playing window on the virtual desktop.

According to a seventh aspect, an embodiment of the present invention provides a computer system, including a communications line; a processor connected to the communications line; and a memory connected to the communications line, where the processor invokes code stored in the memory by means of the communications line, so as to, after a virtual-desktop login request of a user is received, acquire, according to an identifier of the user included in the virtual-desktop login request, metadata of a multimedia instance that is not shut down by the user before a last disconnection, where the metadata at least includes path information of a multimedia file corresponding to the multimedia instance; and send the metadata to a client of the user so that the client acquires, according to the metadata, multimedia data corresponding to the metadata and plays the multimedia data.

According to an eighth aspect, an embodiment of the present invention provides a computer system, including a communications line; a processor connected to the communications line; and a memory connected to the communications line, where the processor invokes code stored in the memory by means of the communications line, so as to, after a virtual-desktop login request of a user is received, acquire, according to an identifier of the user included in the virtual-desktop login request, metadata of a multimedia instance that is not shut down by the user before a last disconnection, where the metadata at least includes a type of a multimedia file corresponding to the multimedia instance and an audio/video encoding format of the multimedia file; send the metadata to a client so that the client creates a player and a decoder according to the type of the multimedia file and the audio/video encoding format of the multimedia file; and push multimedia data corresponding to the multimedia instance that is not shut down to the client so that the client decodes the multimedia data by using the decoder, and plays the decoded multimedia data in the player.

As can be seen from the above, if the technical solutions in the embodiments are applied, during a disconnection of a user, a server automatically stores information related to a multimedia instance that is not shut down by the user before the disconnection; therefore, when the user logs in to a virtual-desktop service again, the server may acquire, according to an identifier of the user, metadata of the multimedia instance that is not shut down by the user before the last disconnection (for a case in which a client actively reads multimedia data during redirection processing of the multimedia instance, the metadata at least includes path information of a multimedia file corresponding to the multimedia instance; for a case in which a server end actively sends multimedia data to a client during redirection processing of the multimedia instance, the metadata at least includes information about a type of a multimedia file corresponding to the multimedia instance and an audio/video encoding format of the multimedia file), and the server sends the metadata to a client so that the client implements resumed playing of the multimedia instance according to the metadata.

In the prior art, if restoration of multimedia redirection fails and multimedia data fails to be obtained when a user logs in again after interruption unexpectedly occurs in a last login, a problem such as a blank or a black screen occurs in a client. In contrast, when the technical solutions in the embodiments of the present invention are applied, it helps to ensure that when a user logs in again, a server automatically pushes, to a client, metadata of a multimedia instance that is not shut down by the user before a last disconnection, so as to ensure that the user can locally resume, according to the metadata of the multimedia instance, playing of multimedia data being played during the last disconnection, thereby implementing continuous playing of multimedia without the occurrence of a situation such as a white screen or a black screen, and helping to significantly improve experience of multimedia application of the user.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

In a research process of the present invention, the inventor finds that multimedia redirection is triggered when a remote virtual-desktop browser loads flash content. In this case, if reconnection is performed after a remote desktop client is closed but a browser at a server end is still in an open state, when the prior art is applied, a trigger condition of flash redirection does not exist; flash that has been loaded before the remote desktop client is closed last time cannot be redirected to the client again, and non-flash content such as a blank or a black screen is presented in a window of the client when the prior art is applied in this case, causing loss of flash content, resulting in great inconvenience to application performed by a user, and affecting practical application performed by the user.

Figure 1:
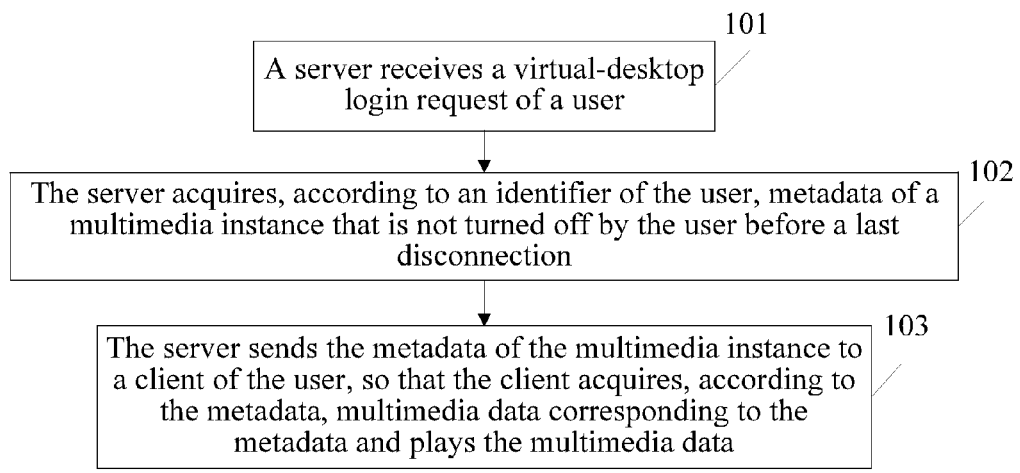
FIG. 1 is a schematic flowchart of a multimedia redirection method according to Embodiment 1 of the present invention.

Referring to FIG. 1, this embodiment provides a multimedia redirection method, which mainly includes the following steps:

Step 101. A server receives a virtual-desktop login request of a user.

The server in this embodiment may be an actual network server or a virtual machine in a cloud computing system.

A client in this embodiment may be a mobile phone terminal, a computer, or another intelligent terminal.

The user enables software of a virtual-desktop remote application by using a client on a user side, and sends the virtual-desktop login request to the server by means of the Internet or a communications network, so as to request to log in to the server by using the virtual-desktop remote application.

When the user sends the virtual-desktop login request, the virtual-desktop login request includes an identifier of the user.

Step 102. The server acquires, according to an identifier of the user, metadata of a multimedia instance that is not shut down by the user before a last disconnection.

In the industry of computers, metadata is data used for describing data and in English the word metadata is used. In this embodiment, the metadata of the multimedia instance at least includes path information of a multimedia file corresponding to the multimedia instance.

After receiving the virtual-desktop login request of the user, the server performs a query according to the identifier of the user in the virtual-desktop login request to find whether a multimedia instance that is not shut down by the user before a disconnection exists when the user logs in last time; if the multimedia instance does not exist, a virtual-desktop login processing process in the prior art is adopted; if the multimedia instance exists, the server may determine that unexpected interruption occurs when the user logs in to the server last time, and perform the following processing based on the technical solution of the present invention:

The server performs a query according to the identifier of the user to acquire related information that is stored in the server and about the multimedia instance that is not shut down by the user before the last disconnection, and acquires the metadata of the multimedia instance that is not shut down by the user before the last disconnection.

For example, the related information that is stored in the server and about the multimedia instance that is not shut down by the user before the last disconnection may specifically be the metadata of the multimedia instance that is not shut down by the user before the last disconnection, and therefore the server directly queries stored information to acquire the metadata of the multimedia instance that is not shut down by the user before the last disconnection.

Further for example, the related information that is stored in the server and about the multimedia instance that is not shut down by the user before the last disconnection is specifically a web page identifier of a web page on which the multimedia instance that is not shut down by the user before the last disconnection is located rather than the metadata, and therefore the server may refresh the web page corresponding to the web page identifier, load the web page again, and acquire the metadata of the multimedia instance on the web page in the process of loading the web page.

In this embodiment, in addition to the path information of the multimedia file corresponding to the multimedia instance, the metadata of the multimedia instance may further include, but is not limited to including, the following information about a playing window of the multimedia instance: size information of the playing window, position information of the playing window on a virtual desktop of the server (specifically coordinate information of boundaries of the playing window), and position information of a covered region of the playing window on the virtual desktop. Therefore, in step 103, when the metadata is sent to a client, the information about the playing window is further sent to the client so that after receiving the metadata, the client may further create the playing window at the client according to a size of the playing window included in the metadata, where the size of the playing window, a position of the playing window, and a position of the covered region of the playing window are completely consistent with those included in the metadata, so as to further ensure that the size and position and the like of the playing window when the user logs in again to play the multimedia instance that is not shut down last time are completely consistent with those last time; therefore, for the user, seemingly, the user continues, right from the moment of the last disconnection, with application of the multimedia that is not closed last time, thereby further improving experience of multimedia application of the user, and enhancing use effects of the virtual desktop.

The multimedia instance in this embodiment is applicable to any multimedia redirection application in which a client actively reads a multimedia file in multimedia redirection, and is, for example, a flash instance; the application may further be extended to other types of multimedia instances.

Assuming that currently it is a flash instance, the foregoing path information of the multimedia file corresponding to the multimedia instance includes path information of a flash media file (for example, but not limited to, a flash file of an swf type) corresponding to the flash instance, and path information of a flash stream media file (for example, but not limited to, a flash file of an flv type) corresponding to the flash instance.

Step 103. The server sends the metadata of the multimedia instance to a client of the user so that the client acquires, according to the metadata, multimedia data corresponding to the metadata and plays the multimedia data.

After acquiring the metadata of the multimedia instance in step 102, the server sends the acquired metadata to the client so that the client restores a multimedia redirection process according to the metadata, that is, acquires, according to the metadata, the multimedia data corresponding to the metadata, and plays the multimedia data at the client.

As can be seen from the above, if the technical solution in this embodiment is applied, during a disconnection of a user, a server automatically stores information related to a multimedia instance that is not shut down by the user before the disconnection; therefore, when the user logs in to a virtual-desktop service again, the server may acquire, according to an identifier of the user, metadata of the multimedia instance that is not shut down by the user before the last disconnection (the metadata at least includes path information of a multimedia file corresponding to the multimedia instance), and the server sends the metadata to a client so that the client acquires, according to the metadata, multimedia data corresponding to the metadata, and plays the multimedia data at the client.

In the prior art, when a user logs in again after interruption unexpectedly occurs in a last login, restoration of multimedia redirection fails and then multimedia data fails to be obtained; as a result, a problem such as a blank or a black screen occurs in a client. In contrast, when the technical solution in this embodiment of the present invention is applied, it helps to ensure that when a user logs in again, a server automatically pushes, to a client, metadata of a multimedia instance that is not shut down by the user before a last disconnection, and ensure that the client may acquire, according to the metadata, multimedia data of the multimedia instance that is not shut down before the last disconnection, so as to ensure that the user can locally resume playing of multimedia being played during the last disconnection, thereby implementing continuous playing of the multimedia without the occurrence of a situation such as a white screen or a black screen, and helping to significantly improve experience of multimedia application of the user.

Embodiment 2

Figure 2:
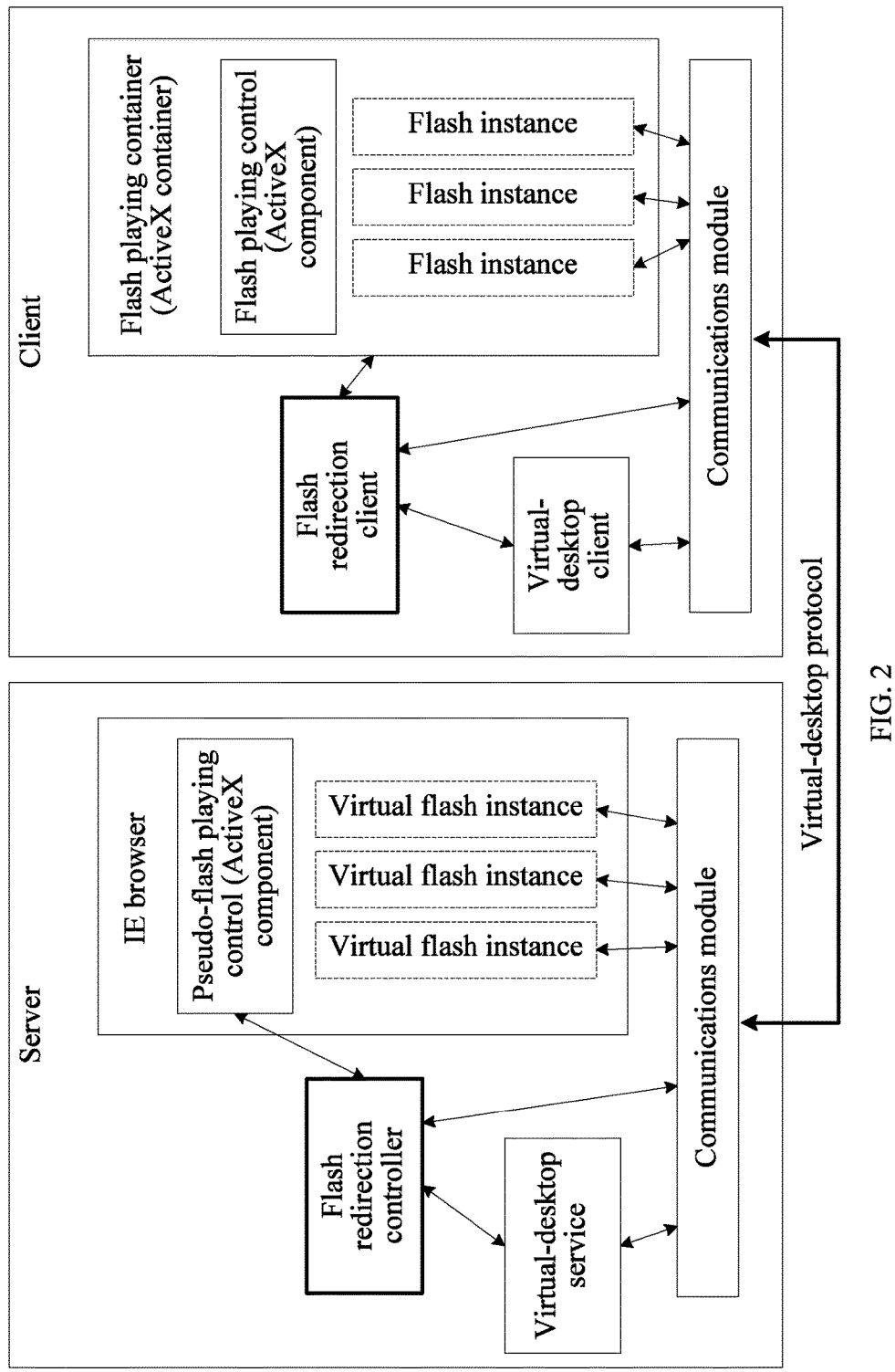
FIG. 2 is a schematic diagram of a framework of flash multimedia redirection according to an embodiment of the present invention.

FIG. 2 is a schematic diagram of a framework of flash multimedia redirection according to an embodiment of the present invention. Other multimedia redirection systems have similar frameworks.

A flash redirection controller in FIG. 2 is a control that is run at a server end that provides a virtual-desktop service; the "flash redirection controller" is configured to perform, at the server end, control and status management on a redirection service for a flash instance.

In FIG. 2, a flash redirection client is an independent control that is run in a virtual-desktop client, and configured to perform, at the client, redirection control work such as process management on redirection for the flash instance and flash redirection control negotiation with the "flash redirection controller".

In FIG. 2, a pseudo-flash playing control at the server end is mainly used as an interface that is the same as a flash playing control at a local end, and is configured to interact with an Internet Explorer (IE) browser at the server end, so as to redirect an obtained flash data stream to the client, and feed back, to the IE browser, information that is fed back by the client.

In FIG. 2, a virtual flash instance at the server end is an object that is created by the pseudo-flash playing control and exists in a memory, where each piece of practically played flash multimedia content corresponds to one virtual flash instance.

In FIG. 2, a Flash playing container of the client is configured to contain an object played by the flash instance on the client.

In FIG. 2, a Flash playing control of the client is: a practical control used for playing flash (for example, but not limited to: an Adobe flash player).

In FIG. 2, a Flash instance on the client is a practically played object that is created by the flash playing control and exists in the memory, where each piece of practically played flash content corresponds to one flash instance.

In FIG. 2, the client and the server end implement, by using a virtual-desktop protocol, flash redirection and other virtual machine desktop functions, and the virtual-desktop protocol may be, but is not limited to the Remote Desktop Protocol (RDP), or the Independent Computing Architecture (ICA) protocol.

Figure 3A:
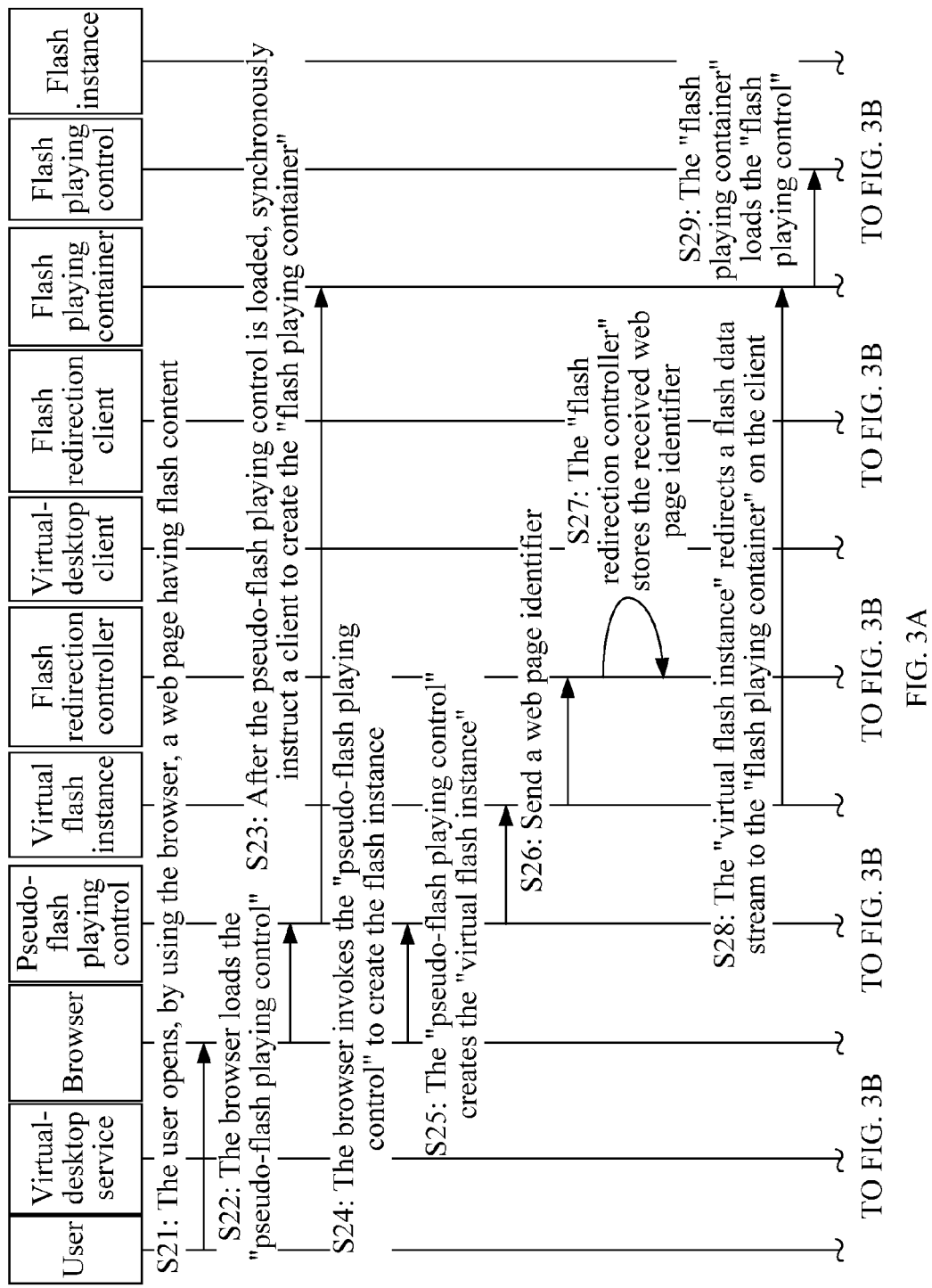
FIG. 3A and FIG. 3B are a schematic flowchart of a multimedia redirection method according to Embodiment 2 of the present invention.
Figure 3B:
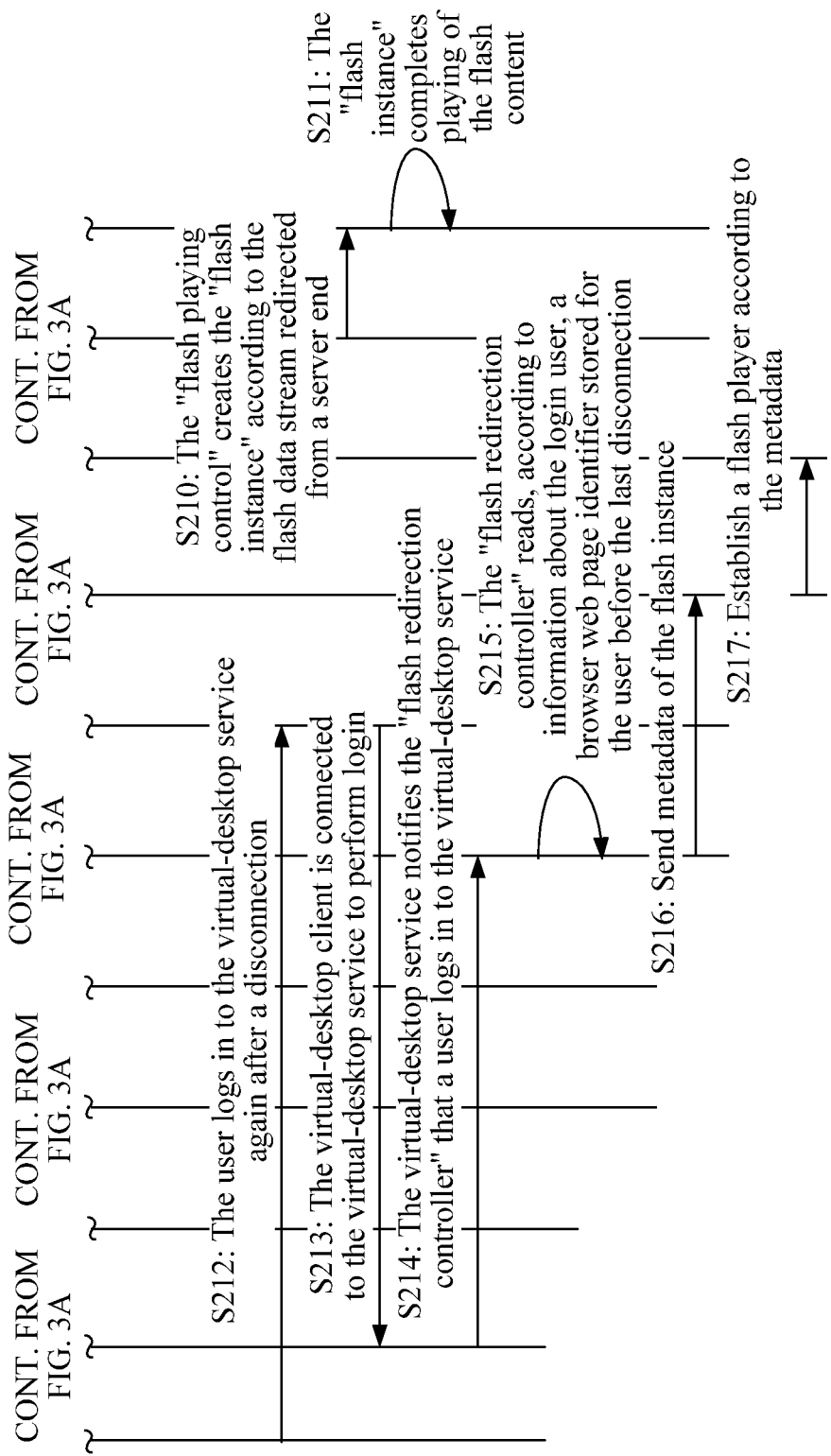

Referring to FIG. 3A and FIG. 3B, a flash multimedia instance is used for illustration in this embodiment to further describe a multimedia redirection method in this embodiment in detail. The method mainly includes the following procedures.

S21. A user opens, by using a browser, a web page having flash content.

After having applied a virtual-desktop service and logged in to a virtual server, the user opens a web page including flash content by applying a browser on the virtual server.

This step may be performed based on, but not limited to, the prior art.

S22. The browser loads a "pseudo-flash playing control".

The browser on the server loads the "pseudo-flash playing control" on the server to prepare for playing of flash.

This step may be performed based on, but not limited to, the prior art.

S23. After the pseudo-flash playing control is loaded, synchronously instruct a client to create a "flash playing container".

After the pseudo-flash playing control on the server is loaded, a message is sent to the client to synchronously instruct the client to create the "flash playing container".

This step may be performed based on, but not limited to, the prior art.

S24. The browser invokes the "pseudo-flash playing control" to create a flash instance.

The browser on the server invokes the "pseudo-flash playing control" to create the flash instance.

This step may be performed based on, but not limited to, the prior art.

S25. The "pseudo-flash playing control" creates a "virtual flash instance".

The browser on the server invokes the "pseudo-flash playing control" on the server to create the flash instance.

This step may be performed based on, but not limited to, the prior art.

S26. Send a web page identifier.

After the "virtual flash instance" on the server is created, the server sends a web page identifier of a web page on which the flash instance is located to a "flash redirection controller" on the server.

After the "virtual flash instance" on the server is created, the web page identifier of the web page on which the flash instance is located is sent to the "flash redirection controller" on the server, and the web page identifier of the web page on which the flash instance is located is stored, at the server end, as metadata of the flash instance.

S27. A "flash redirection controller" stores the received web page identifier.

After the server has created the flash instance, the "flash redirection controller" control on the server stores the web page identifier of the web page on which the current flash instance is located. The web page identifier is an identifier that uniquely identifies the web page in a network, and the server can accurately locate the web page according to the web page identifier.

In this embodiment, the "flash redirection controller" on the server may store the web page identifier of the web page on which the current flash instance is located after the flash instance is successfully created, or store the web page identifier of the web page on which the current flash instance is located at the moment when the user is disconnected or before the moment when the user is disconnected.

Each time the user shuts down a flash instance, the "flash redirection controller" control on the server deletes a web page identifier of a web page on which the flash instance is located from the server to ensure that the web page identifier that is stored in the server and of the web page on which the flash instance is located is the web page identifier of the web page on which the flash instance that is not shut down by the user before a last disconnection is located. The "shut down and then delete" technical solution is adopted; therefore, in one aspect, occupation of storage space by flash is reduced, thereby preventing redundancy of metadata stored for the flash instance on the server, and in another aspect, it further becomes convenient for the server to acquire metadata of a flash instance that is not shut down by the user before a disconnection, thereby reducing the workload of data acquisition of the server.

S28. The "virtual flash instance" redirects a flash data stream to the "flash playing container" on the client.

After the flash instance is created, the "virtual flash instance" control on the server redirects the flash data stream to the "flash playing container" control on the client so that the "flash playing container" control on the client performs processing of the redirection process at the client. That is, metadata of each flash instance on the web page is acquired, and the metadata of the flash instance is sent to the client so that the client reads, according to the metadata of the flash instance, a multimedia file (that is, multimedia data) corresponding to the flash instance, so as to perform processing and playing of the multimedia data at the client. The more detailed process is as follows:

S29. The "flash playing container" loads a "flash playing control".

The "flash playing container" on the client loads the "flash playing control" after the Flash playing control is installed at the client. That is, the client loads the multimedia file (that is, multimedia data) corresponding to the flash instance according to metadata of the flash instance.

This step may be performed based on, but not limited to, the prior art.

S210. The "flash playing control" creates a "flash instance" according to the flash data stream redirected from a server end.

The "flash playing control" on the client creates the "flash instance" according to the flash data stream redirected from the server end.

This step may be performed based on, but not limited to, the prior art.

S211. The "flash instance" completes playing of the flash content.

The "flash instance" on the client completes the playing of the flash content.

This step may be performed based on, but not limited to, the prior art.

S212. The user logs in to a virtual-desktop service again after a disconnection.

After the user is disconnected, the user attempts to connect the server again.

This step may be performed based on, but not limited to, the prior art.

S213. A virtual-desktop client is connected to the virtual-desktop service to perform login.

The user attempts to connect the server again, and sends a virtual-desktop login request to the server to request to log in to the virtual-desktop service of the server again. The details may be, but are not limited to, those in step 101 in Embodiment 1.

This step may be performed based on, but not limited to, the prior art.

S214. The virtual-desktop service notifies the "flash redirection controller" that a user logs in to the virtual-desktop service.

After receiving the virtual-desktop login request of the user, the server end notifies the "flash redirection controller" at the server end that a user logs in to the virtual-desktop service.

This step may be performed based on, but not limited to, the prior art.

S215. The "flash redirection controller" reads, according to information about the login user, a browser web page identifier stored for the user before the last disconnection.

The "flash redirection controller" at the server end reads, according to an identifier of the user, the browser web page identifier stored for the user before the last disconnection.

For details, reference may be made to corresponding records in step 102 in Embodiment 1 but the details are not limited thereto.

S216. Send metadata of the flash instance.

The "flash redirection controller" on the server drives, according to the read web page identifier, the browser to refresh a corresponding page.

The "flash redirection controller" on the server starts, according to the metadata of the flash instance, a flash redirection process, and sends read metadata of the flash instance to a "flash redirection client" control on the client.

S217. Establish a flash player according to the metadata.

The flash content is loaded again after a browser page is refreshed, thereby driving a start process of flash redirection again, and implementing redirection of the flash content to the client again.

After the browser page on the server is refreshed on the server, the flash content is loaded again, and a flash redirection process of the web page is triggered, thereby driving the start process of flash redirection again, and implementing the redirection of the flash content to the client again. That is, after the server loads a page again on the refreshed web page, the server acquires the metadata of the flash instance on the web page again, and sends the metadata of the flash instance to the client so that the client loads, according to the metadata of the flash instance, the multimedia file (that is, multimedia data) corresponding to the flash instance, so as to perform the procedures of steps S210 and S211 at a local end to perform playing of multimedia.

It should be noted that, in this embodiment, a specific processing process in which a user is disconnected and logs in again in a process of flash redirection processing after login to a virtual-desktop service is used as an example for detailed illustration of the flash redirection procedures in this embodiment. However, in practical applications, according to actual needs, an order of some procedures may be adjusted or some procedures may be added or deleted; the present invention is not limited thereto. It may be regarded as an invention the same as or similar to the present invention as long as that during flash redirection processing, according to a pre-stored identifier of a web page on which a flash instance is located or any information with which a server can uniquely find the web page, the server drives a browser to refresh a page and load the web page again so that the server can obtain metadata of the flash instance again, and sends the metadata to a client, so as to enable the client to load flash content again according to the metadata and implement continuous playing.

Embodiment 3

Figure 4A:
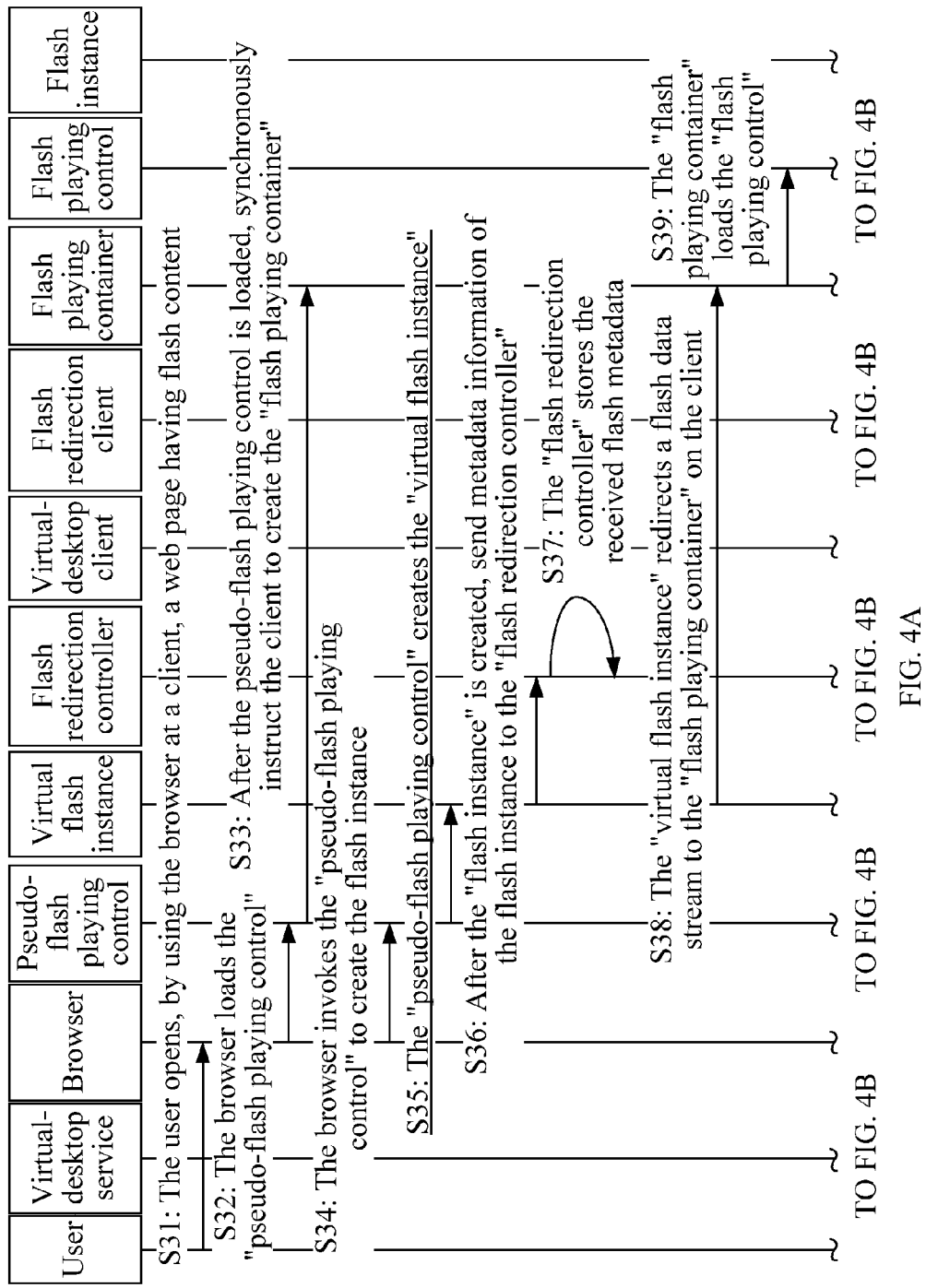
FIG. 4A and FIG. 4B are a schematic flowchart of a multimedia redirection method according to Embodiment 3 of the present invention.
Figure 4B:
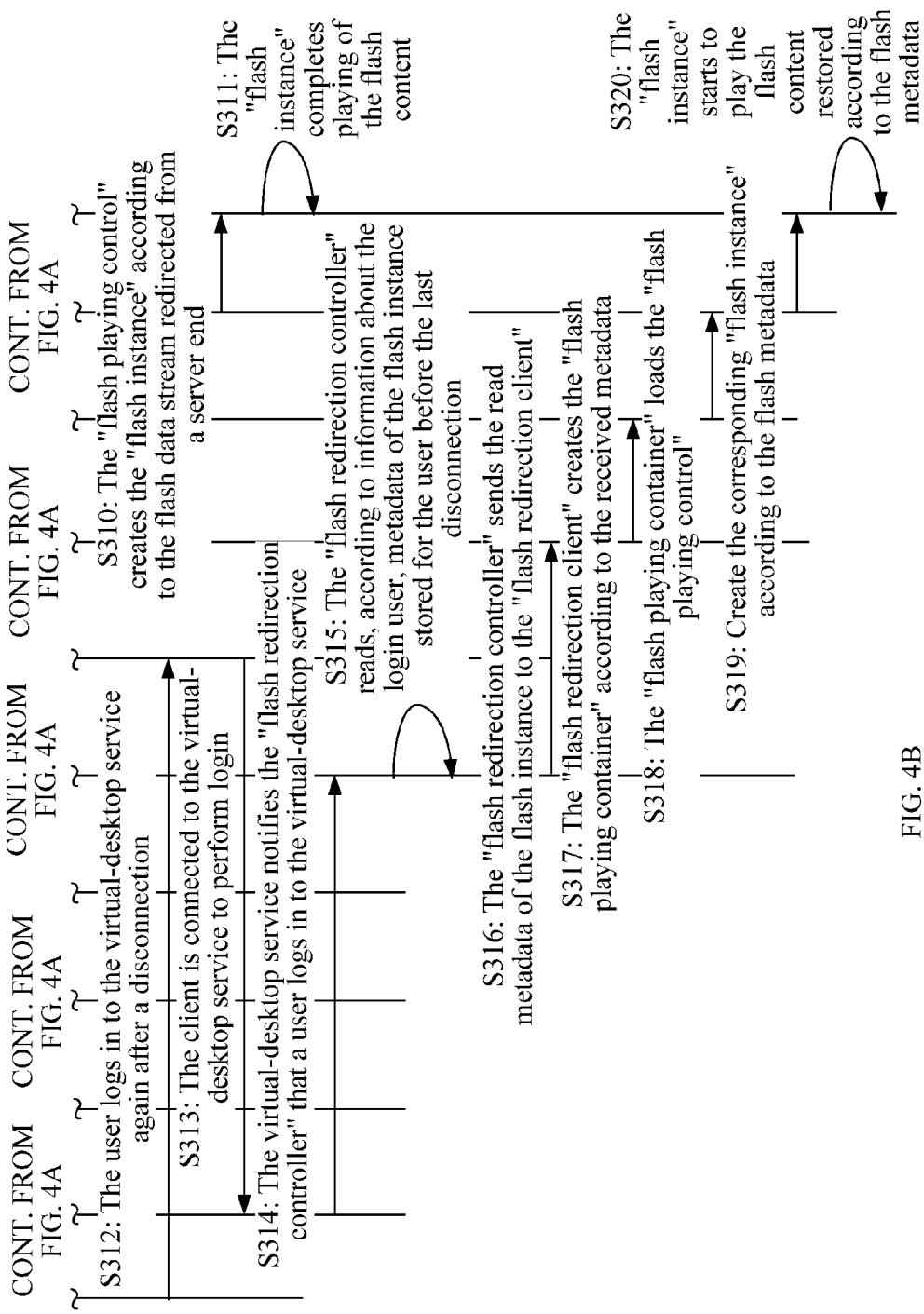

Referring to FIG. 4A and FIG. 4B, a flash multimedia instance is used for illustration in this embodiment to further describe a multimedia redirection method in this embodiment in detail. The method mainly includes the following procedures.

S31. A user opens, by using a browser at a client, a web page having flash content.

After having applied a virtual-desktop service and logged in to a server, the user opens a web page including flash content by applying a browser on a virtual server.

This step may be performed based on, but not limited to, the prior art.

S32. The browser loads a "pseudo-flash playing control".

The browser on the server loads a "flash playing control" (actually loads the "pseudo-flash playing control") on the server to prepare for playing of flash.

This step may be performed based on, but not limited to, the prior art.

S33. After the pseudo-flash playing control is loaded, synchronously instruct the client to create a "flash playing container".

After the pseudo-flash playing control on the server is loaded, a message is sent to the client to synchronously instruct the client to create the "flash playing container".

This step may be performed based on, but not limited to, the prior art.

S34. The browser invokes the "pseudo-flash playing control" to create a flash instance.

The browser on the server invokes the "pseudo-flash playing control" to create the flash instance.

This step may be performed based on, but not limited to, the prior art.

S35. The "pseudo-flash playing control" creates a "virtual flash instance".

The browser on the server invokes the "pseudo-flash playing control" to create the flash instance.

This step may be performed based on, but not limited to, the prior art.

S36. After the "flash instance" is created, send metadata of the flash instance to a "flash redirection controller".

After the "flash instance" is created, the server sends the information about the metadata of the flash instance to the "flash redirection controller" on the server.

A difference between this step and step S26 in Embodiment 2 mainly lies in that, in this step, the metadata of the flash instance is directly stored so that the metadata of the flash instance may be directly acquired in a query manner during next login without a need to load again by refreshing a web page.

In this embodiment, the structure definition of the metadata of the flash instance may be, but is not limited to, the following structure definition:

```
FlashMetaData//metadata of a flash instance
{
    swfUrl;//a file path of flashswf
    flvUrl;//a file path of flashflv
    FlashPosition//a position of a flash playing window on a virtual desktop of a server
    {
        topLeftX;//an X coordinate of the top-left corner of the flash playing window
        topLeftY;//a Y coordinate of the top-left corner of the flash playing window
        bottomRightX;//an X coordinate of the bottom-right corner of the flash playing window
        bottomRightY;//a Y coordinate of the bottom-right corner of the flash playing window
    }
```

```
    CoverRegion //a region, of the flash playing window, covered by another window
    {
        topLeftX;//an X coordinate of the top-left corner of the covered region
        topLeftY;//a Y coordinate of the top-left corner of the covered region
        bottomRightX;//an X coordinate of the bottom-right corner of the covered region
        bottomRightY;//a Y coordinate of the bottom-right corner of the covered region
    }
}
```

It should be noted that metadata elements included in the foregoing definition of the metadata of the flash instance are only exemplary illustration of this embodiment; in practical system implementation, other additional metadata elements may be added according to needs. In this embodiment, the metadata of the flash instance may use the foregoing data structure, may also use another data structure, or may further include more metadata elements according to a definition of the user.

S37. The "flash redirection controller" stores the received flash metadata.

After the flash instance is created, the "flash redirection controller" control on the server stores the metadata of the current flash instance.

In this embodiment, the "flash redirection controller" on the server may store the metadata of the flash instance after the flash instance is successfully created, or store the metadata of the flash instance at the moment when the user is disconnected or before the moment when the user is disconnected.

Each time the user shuts down a flash instance, the "flash redirection controller" control on the server deletes metadata of the flash instance from the server to ensure that the metadata of the flash instance stored in the server is the metadata of the flash instance that is not shut down by the user before a last disconnection. Therefore, in one aspect, occupation of storage space by flash is reduced, thereby preventing redundancy of metadata stored for the flash instance on the server, and in another aspect, it further becomes convenient for the server to acquire metadata of a flash instance that is not shut down by the user before a disconnection, thereby reducing the workload of data acquisition of the server.

S38. The "virtual flash instance" redirects a flash data stream to the "flash playing container" on the client.

After the flash instance is created, the "virtual flash instance" control on the server redirects the flash data stream to the "flash playing container" control on the client so that the "flash playing container" control on the client performs processing of the redirection process at the client.

S39. The "flash playing container" loads a "flash playing control".

The "flash playing container" on the client loads the "flash playing control" at a server end.

This step may be performed based on, but not limited to, the prior art.

S310. The "flash playing control" creates a "flash instance" according to the flash data stream redirected from a server end.

The "flash playing control" on the client creates the "flash instance" according to the flash data stream redirected from the server end.

This step may be performed based on, but not limited to, the prior art.

S311. The "flash instance" completes playing of the flash content.

The "flash instance" on the client completes the playing of the flash content.

This step may be performed based on, but not limited to, the prior art.

S312. The user logs in to a virtual-desktop service again after a disconnection.

After the user is disconnected, the user attempts to connect the server again.

This step may be performed based on, but not limited to, the prior art.

S313. The client is connected to the virtual-desktop service to perform login.

A virtual-desktop client attempts to connect the server again, and sends a virtual-desktop login request to the server to request to log in to the virtual-desktop service on the server again. The details may be, but are not limited to, those in step 101 in Embodiment 1.

This step may be performed based on, but not limited to, the prior art.

S314. The virtual-desktop service notifies the "flash redirection controller" that a user logs in to the virtual-desktop service.

After receiving the virtual-desktop login request of the user, the server end notifies the "flash redirection controller" at the server end that a user logs in to the virtual-desktop service.

This step may be performed based on, but not limited to, the prior art.

S315. The "flash redirection controller" reads, according to information about the login user, metadata of the flash instance stored for the user before the last disconnection.

The "flash redirection controller" at the server end reads, according to an identifier of the user, the metadata of the flash instance stored for the user before the last disconnection, that is, the metadata of the flash instance that is not shut down by the user before the disconnection.

For details, reference may be made to corresponding records in step 102 in Embodiment 1 but the details are not limited thereto.

S316. The "flash redirection controller" sends the read metadata of the flash instance to a "flash redirection client".

The "flash redirection controller" on the server sends the read metadata of the flash instance to the "flash redirection client" control on the client.

S317. The "flash redirection client" creates a "flash playing container" according to the received metadata.

The "flash redirection client" on the client creates the "flash playing container" according to the received metadata.

Specifically, the data of the flash instance is acquired again according to the flashswf file path and the flashflv file path, and the "flash playing container" is locally created according to position information of a flash playing window on a virtual desktop of the server and position information of a covered region.

For details, reference may be made to corresponding records in step 103 in Embodiment 1 but the details are not limited thereto.

S318. The "flash playing container" loads the "flash playing control".

The "flash playing container" on the client loads the "flash playing control" at the server end.

This step may be performed based on, but not limited to, the prior art.

S319. Create a corresponding "flash instance" according to the flash metadata.

The "flash playing control" on the client creates the "flash instance" according to the flash data stream redirected from the server end.

This step may be performed based on, but not limited to, the prior art.

S320. The "flash instance" starts to play the flash content restored according to the flash metadata.

The "flash instance" on the client completes playing of the flash content.

This step may be performed based on, but not limited to, the prior art.

As can be seen from the above, when the technical solution in this embodiment is applied to redirection processing of flash multimedia, when a user logs in again, a server may start, according to stored metadata of a flash instance that is not shut down during a last disconnection, a flash redirection process to send the metadata to a client so that the client continues with the process of the flash redirection processing according to the metadata to resume playing of the flash instance from the last disconnection, thereby implementing continuous playing of flash content.

It should be noted that, in this embodiment, a specific processing process in which a user is disconnected and logs in again in a process of flash redirection processing after login to a virtual-desktop service is used as an example for detailed illustration of the flash redirection procedures in this embodiment. However, in practical applications, according to actual needs, an order of some procedures may be adjusted or some procedures may be added or deleted; the present invention is not limited thereto. It may be regarded as a technical solution the same as or similar to the present invention as long as that during flash redirection processing, if a user does not shut down a multimedia instance before a last disconnection, a server automatically sends previously stored metadata of a flash instance to a client so that the client automatically performs flash redirection processing on flash content according to the metadata, and performs restoration to implement continuous playing.

As can be seen from the above, in addition to the effects in Embodiment 2, this embodiment may further produce the following effects.

In this embodiment, metadata of a flash instance that needs redirection is obtained without refreshing the flash instance again. Instead, metadata of a flash instance that is not shut down before a last disconnection is directly stored at a server end. When a user logs in again, the server directly sends the metadata of the flash instance to the client so that the client restores flash redirection processing according to the metadata. When the technical solution in this embodiment is adopted, problems such as network data loss caused by web page refreshing can be prevented; the technical solution in this embodiment is further especially applicable to multimedia redirection applications such as network forums and mailboxes.

Embodiment 4

Figure 5:
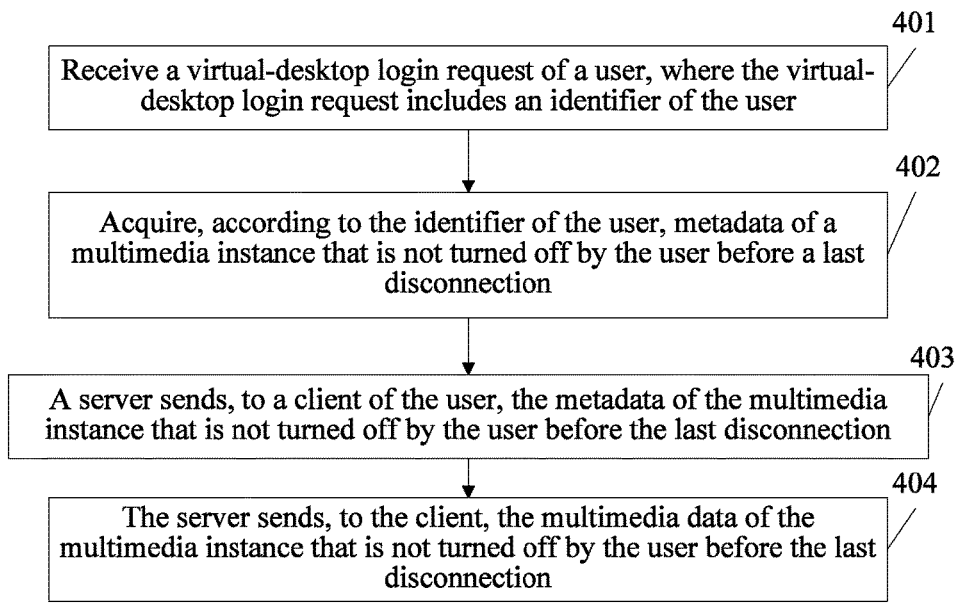
FIG. 5 is a schematic flowchart of a multimedia redirection method according to Embodiment 4 of the present invention.

Referring to FIG. 5, a multimedia redirection method provided in this embodiment mainly includes the following procedures:

Step 401. Receive a virtual-desktop login request of a user, where the virtual-desktop login request includes an identifier of the user.

This step is similar to step 101 in Embodiment 1.

Step 402. Acquire, according to the identifier of the user, metadata of a multimedia instance that is not shut down by the user before a last disconnection.

The metadata of each multimedia instance in this embodiment at least includes information about a type of a multimedia file corresponding to the multimedia instance and an audio/video encoding format of the multimedia file.

This step is similar to step 102 in Embodiment 1.

In this embodiment, when the metadata of the multimedia instance is applied to a virtual-desktop service, in a case in which a client does not actively read data and a server pushes data to the client in multimedia redirection, when a multimedia instance playing of which is not shut down by a user exists when the client is disconnected from the server, for the client, the connection between the client and the server is in a network disconnected state, and the client cannot receive multimedia data pushed by the server; however, for the server, the multimedia instance in a browser on the server is not shut down and in a state of continued playing. In this embodiment, it is assumed that:

The server opens, according to an operation on a media player of the server performed by the user, a multimedia file by using a player to perform playing of a multimedia instance. After reading a type of the multimedia file and an audio/video encoding format of the multimedia file, the server stores the type of the multimedia file corresponding to the multimedia instance and the audio/video encoding format of the multimedia file as metadata of the multimedia instance; when the metadata of the multimedia instance is stored, the metadata of the multimedia instance is made corresponding to the identifier of the user. Therefore, when the user logs in again, the server finds, according to the identifier of the login user, the metadata of the multimedia instance that is not shut down by the user before a last disconnection.

In this embodiment, an identifier of metadata of a multimedia instance of each user may be used to identify whether the metadata of the multimedia instance is metadata of a multimedia instance that is shut down by a user or metadata of a multimedia instance that is not shut down by a user. A server may also delete metadata of a multimedia instance from the server each time a user shuts down the multimedia instance, so as to ensure that metadata that is stored in the server and of a multimedia instance of each user is metadata of a multimedia instance that is not shut down by the user before a last disconnection. When the technical solution in which metadata of a multimedia instance is deleted after the multimedia instance is shut down is adopted, in one aspect, occupation of storage space by metadata of a multimedia instance is reduced, thereby preventing redundancy of metadata that is stored in the server and of the multimedia instance; in another aspect, it further becomes convenient for the server to acquire metadata of a multimedia instance that is not shut down by the user before a disconnection, thereby reducing the workload of data acquisition of the server.

A redirected playing process of an audio/video multimedia instance is mainly as follows:

1. A user logs in to a server by using a virtual-desktop service, and opens a media player on the server. The media player may be, but is not limited to, a Microsoft multimedia player (Windows Media Player).

2. The user operates the player on the server by using the virtual-desktop service, and opens a multimedia file (the multimedia file is a multimedia file corresponding to the so-called multimedia instance in the playing state in this embodiment, and the multimedia file may be, but is not limited to being, stored on a server side) in a network by using the player.

3. The player on the server reads a type of the multimedia file and an audio/video encoding format of the multimedia file.

A difference between the step in this embodiment and the prior art includes, after the multimedia file type of the multimedia file to be played and the audio/video encoding format of the multimedia file are determined, the information is stored in the server, and the stored data and a current identifier of the user correspond to each other. Therefore, when the technical solution in this embodiment is applied, when the user logs in again, the server may determine, according to the identifier of the user, metadata of a multimedia instance that is not shut down by the user before a last disconnection. For the specific storage method, refer to the introduction in the foregoing.

4. The server automatically creates, according to the type of the multimedia file and the audio/video encoding format of the multimedia file, a decoding topological structure needed for playing the multimedia file.

In the process of creating the decoding topological structure, a compiler (also referred to as RenderSink) in an actual topology is replaced in a hook application programming interface (HookApplicationProgrammingInterface, briefly referred to as HookAPI) manner to create and implement a direct compiler (also referred to as RedirectRenderSink).

5. The RedirectRenderSink on the server sends, to a client, the type of the multimedia file and the audio/video encoding format of the multimedia file that are obtained by means of reading by the player.

6. The client locally creates, according to the type of the multimedia file and the audio/video encoding format of the multimedia file that are received from the server, an actual player and a decoding topological structure (so as to perform decoding processing on multimedia data pushed by the server).

7. The player on the server reads the multimedia file to obtain the multimedia data, and sends, by using the RedirectRenderSink on the server, the obtained multimedia data to the remote client.

So far, redirected playing of a multimedia instance is implemented in an active push manner.

In the implementation, when the user applies the virtual-desktop service to perform redirected playing on the multimedia instance in this embodiment, the metadata of the multimedia instance may be stored in step 3 in the foregoing, or stored at any moment during a playing process of the multimedia instance before the user is disconnected after step 3. It is only required to store, after the user is disconnected, on the server side, the metadata of the multimedia instance that is not shut down by the user before the disconnection. In this way, when the user logs in to the server again, the metadata of the multimedia instance that is not shut down by the user before the last disconnection may be acquired according to the identifier of the user.

In this embodiment, in addition to the type of the multimedia file corresponding to the multimedia instance that is not shut down at the moment of the last disconnection and before the disconnection and the audio/video encoding format of the multimedia file, the metadata of the multimedia instance may further include but is not limited to including, the following information about a playing window of the multimedia instance: size information of the playing window, position information of the playing window on a virtual desktop of the server (specifically coordinate information of boundaries of the playing window), and position information of a covered region of the playing window on the virtual desktop. Therefore, in step 403, when the metadata is sent to a client, the information about the playing window is further sent to the client so that after receiving the metadata, the client may further create the playing window at the client according to a size of the playing window included in the metadata, where the size of the playing window, a position of the playing window, and a position of the covered region of the playing window are completely consistent with those included in the metadata, so as to further ensure that the size and position and the like of the playing window when the user logs in again to play the multimedia instance that is not shut down last time are completely consistent with those last time; therefore, for the user, seemingly, the user continues, right from the moment of the last disconnection, with application of the multimedia that is not closed last time, thereby further improving experience of multimedia application of the user, and enhancing use effects of the virtual desktop.

Step 403. A server sends, to a client of the user, the metadata of the multimedia instance that is not shut down by the user before the last disconnection.

After receiving the metadata, the server sends the metadata to the client.

After receiving the metadata, the client creates a player and a decoding topological structure, at the client, according to a type of a multimedia file and an audio/video encoding format of the multimedia file in the metadata at the client so that after receiving multimedia data from the server, the client uses the decoding topological structure to perform decoding processing on the multimedia data, so as to play the decoded multimedia data in the player on the client.

Step 404. The server sends, to the client, the multimedia data of the multimedia instance that is not shut down by the user before the last disconnection.

That is, the server pushes, to the client of the user, multimedia data of a multimedia instance that corresponds to the user and is currently in a playing state on the server.

After receiving the multimedia data sent by the server, the client uses the decoding topological structure, which is created according to the metadata that is sent by the server and of the multimedia instance, to perform decoding processing on the multimedia data, and plays the decoded multimedia data in a player which is created according to the metadata that is sent by the server and of the multimedia instance.

As can be seen from the above, if the technical solution in this embodiment is applied, during a disconnection of a user, a server automatically stores metadata of a multimedia instance that is not shut down by the user before the disconnection; therefore, when the user logs in to a virtual-desktop service again, the server may acquire, according to an identifier of the user, the metadata of the multimedia instance that is not shut down by the user before the last disconnection (the metadata at least includes information about a type of a multimedia file corresponding to the multimedia instance that is not shut down before the last disconnection, and an audio/video encoding format of the multimedia file) so that the server sends the metadata to a client, so as to restore, at the client, creation of a decoding topological structure and a player corresponding to the multimedia instance; in addition, the server sends, to the client, multimedia data of the multimedia instance that is not shut down so that after receiving the multimedia data, the client may use the created decoding topological structure to perform data decoding, and then play the multimedia data in the player. In this way, the client can play the multimedia instance that is not shut down by the user before the last disconnection.

In the prior art, if restoration of multimedia redirection fails and multimedia data fails to be obtained when a user logs in again after interruption unexpectedly occurs in a last login, a problem such as a blank or a black screen occurs in a client. In contrast, when the technical solution in this embodiment of the present invention is applied, it helps to ensure that when a user logs in again, a server locally stores data corresponding to a multimedia instance that is not shut down by the user before a last disconnection so that metadata of the multimedia instance that is not shut down by the user before the last disconnection can be acquired when the user logs in again, and the server automatically pushes, to a client, multimedia data and the metadata of the multimedia instance that is not shut down by the user before the last disconnection, so as to ensure that the user can locally resume playing of multimedia being played during the last disconnection, thereby implementing continuous playing of the multimedia without the occurrence of a situation such as a white screen or a black screen, and helping to significantly improve experience of multimedia application of the user.

This embodiment is especially applicable to the following application scenario: in a multimedia redirection process, after a server acquires multimedia data of a multimedia instance, the server actively pushes the multimedia data to a client, and the client performs data processing such as decoding on the received multimedia data and then performs multimedia playing.

Embodiment 5

Figure 6:
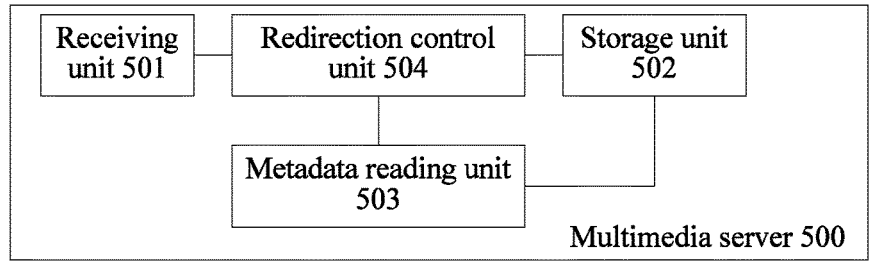
FIG. 6 is a schematic structural diagram of a multimedia server according to Embodiment 5 of the present invention.

Referring to FIG. 6, this embodiment provides a multimedia server 500, which mainly includes a receiving unit 501, a storage unit 502, a metadata reading unit 503, and a redirection control unit 504. Connection relationships and working principles of these parts are as follows.

The receiving unit 501 is configured to receive a virtual-desktop login request of a user, where the virtual-desktop login request includes an identifier of the user. For the working principle, reference may be made to step 101 in Embodiment 1, step S213 in Embodiment 2, and step S313 in Embodiment 3, but the working principle is not limited thereto.

The storage unit 502 is electrically connected to the metadata reading unit 503 and the redirection control unit 504. The storage unit 502 stores information about a multimedia instance that is not shut down by the user before a last disconnection. The information about the multimedia instance may include a web page identifier of a web page on which the multimedia instance is located, or is specifically metadata of the multimedia instance, where the metadata at least includes path information of a multimedia file corresponding to the multimedia instance. For details, refer to corresponding records of 102 in Embodiment 1, steps S26 and S36 in Embodiments 2 and 3, and the like.

The metadata reading unit 503 is in a circuit connection to the storage unit 502 and the redirection control unit 504, and is configured to read, according to the identifier of the user in the virtual-desktop login request received by the receiving unit 501, the metadata that is stored in the storage unit 502 and of the multimedia instance that is not shut down by the user before the last disconnection.

When the information that is stored in the storage unit 502 and about the multimedia instance that is not shut down before the last disconnection is specifically the web page identifier of the web page on which the multimedia instance that is not shut down by the user before the last disconnection is located, the metadata reading unit 503 is configured to perform a query on the storage unit 502 according to the identifier of the user to acquire the web page identifier of the web page on which the multimedia instance that is not shut down by the user before the last disconnection is located; and according to the web page identifier, refresh the web page, load the web page again, and acquire the metadata of the multimedia instance on the web page.

When the information that is stored in the storage unit 502 and about the multimedia instance that is not shut down before the last disconnection is specifically the metadata of the multimedia instance that is not shut down by the user before the last disconnection, the metadata reading unit 503 is configured to perform a query on the storage unit 502 according to the identifier of the user to acquire the metadata of the multimedia instance that is not shut down by the user before the last disconnection.

The metadata that is stored in the storage unit 502 and of each multimedia instance at least includes path information of a multimedia file corresponding to each multimedia instance so that a client acquires, after receiving the metadata, the multimedia file, and reads the multimedia file to obtain multimedia data.

The metadata that is stored in the storage unit 502 and of each multimedia instance may further include information about a playing window of the multimedia instance, a size of the playing window, a position of the playing window on a virtual desktop of the server, and a position of a covered region of the playing window on the virtual desktop. Therefore, after receiving the metadata sent by the server, the client creates the playing window according to the information about the playing window included in the received metadata of the multimedia instance, and plays the multimedia data in the created playing window. Therefore, experience of multimedia application of the user is further improved.

For a detailed working principle, refer to records of step 102 in Embodiment 1, and steps S215 and S315 in Embodiments 2 and 3.

The redirection control unit 504 is electrically connected to the receiving unit 501, the storage unit 502, and the metadata reading unit 503 separately, and is configured to control the work of each part as follows: when the receiving unit 501 receives the virtual-desktop login request of the user, the redirection control unit 504 controls the metadata reading unit 503 to read the storage unit 502; the metadata reading unit 503 acquires by means of reading, according to the information that is in the storage unit 502 and about the multimedia instance that is not shut down before the last disconnection, the metadata corresponding to the user; after the metadata reading unit 503 acquires, by means of reading, the metadata corresponding to the user, the redirection control unit 504 sends, according to the metadata obtained by the metadata reading unit 503, the metadata to the client of the user so that the client acquires, according to the metadata, the multimedia data corresponding to the metadata, and plays the multimedia data at the client. For a more detailed working principle, refer to the records of step 103 in Embodiment 1 and steps S216 and S217 and steps S316 and S317 in Embodiments 2 and 3.

As can be seen from the above, if the technical solution in this embodiment is applied, before a user is disconnected, the multimedia server 500 in this embodiment automatically stores information related to a multimedia instance that is not shut down by the user before the disconnection; therefore, when the receiving unit 501 receives a login request from the user to log in to a virtual-desktop service again, the metadata reading unit 503 of the server 500 acquires, according to an identifier of the user and information that is stored in the storage unit 502, metadata of the multimedia instance that is not shut down by the user before the last disconnection (the metadata at least includes path information of a multimedia file corresponding to the multimedia instance) so that the redirection control unit 504 of the server 500 actively sends the metadata to a client, so as to enable the client to restore a multimedia redirection process, acquire, according to the metadata, multimedia data corresponding to the metadata, and play the multimedia data at the client. In the prior art, if restoration of multimedia redirection fails and multimedia data fails to be obtained when a user logs in again after interruption unexpectedly occurs in a last login, a problem such as a blank or a black screen occurs in a client. In contrast, when the technical solution in this embodiment of the present invention is applied, it helps to ensure that when a user logs in again, the server 500 automatically pushes, to a client, metadata of a multimedia instance that is not shut down by the user before a last disconnection, and ensure that the client may acquire, according to the metadata, multimedia data of the multimedia instance that is not shut down before the last disconnection, so as to ensure that the user can locally resume playing of multimedia being played during the last disconnection, thereby implementing continuous playing of the multimedia without the occurrence of a situation such as a white screen or a black screen, and helping to significantly improve experience of multimedia application of the user.

In addition to the path information of the multimedia file corresponding to the multimedia instance, the metadata stored in the multimedia instance storage unit 502 in this embodiment may further include, as shown in Embodiment 3, position information of the playing window of the multimedia instance on the virtual desktop of the server 500, and position information of the covered region of the playing window on the virtual desktop.

Assuming that a current multimedia instance is a flash instance, in metadata of the flash instance, path information of a multimedia file corresponding to the multimedia instance includes: path information of a flash media file (for example, a flash file of an swf type) corresponding to the flash instance, and path information of a flash stream media file (for example, a flash file of an flv type) corresponding to the flash instance.

Embodiment 6

Figure 7:
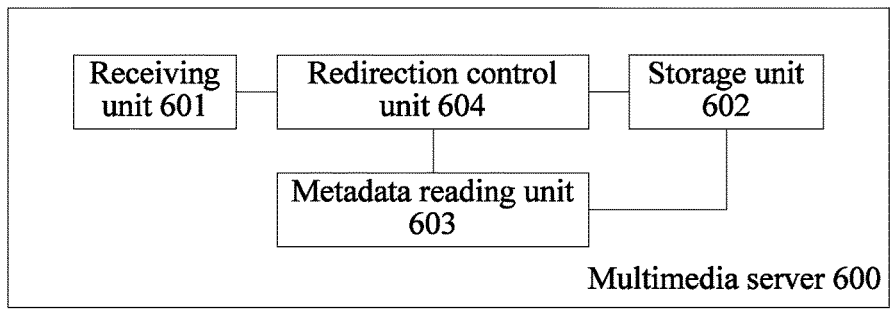
FIG. 7 is a schematic structural diagram of a multimedia server according to Embodiment 6 of the present invention.

Referring to FIG. 7, this embodiment provides a multimedia server 600, which mainly includes a receiving unit 601, a storage unit 602, a metadata reading unit 603, and a redirection control unit 604. Connection relationships and working principles of these parts are as follows:

The receiving unit 601 is configured to receive a virtual-desktop login request of a user, where the virtual-desktop login request includes an identifier of the user. For the working principle, reference may be made to step 101 in Embodiment 1, step S213 in Embodiment 2, and Step S313 in Embodiment 3, but the working principle is not limited thereto.

The storage unit 602 is electrically connected to the metadata reading unit 603 and the redirection control unit 604, and the storage unit 602 stores metadata of a multimedia instance that is not shut down by the user before a last disconnection.

The metadata that is stored in the storage unit 602 and of the multimedia instance at least includes a type of a multimedia file corresponding to the multimedia instance and an audio/video encoding format of the multimedia file; therefore, after the redirection control unit 604 sends, to a client, the metadata of the multimedia instance that is not shut down by the user before the last disconnection, the client may create a player and a decoder according to the type of the multimedia file and the audio/video encoding format of the multimedia file, and the client decodes, after receiving multimedia data pushed by the server, the multimedia data by using the decoder on the client, and plays the decoded multimedia data in the player.

The metadata reading unit 603 is in a circuit connection to the storage unit 602 and the redirection control unit 604, and is configured to perform a query on the storage unit 602 according to the identifier of the user in the virtual-desktop login request received by the receiving unit 601, and acquire by means of reading, from the storage unit 602, the metadata of the multimedia instance that is not shut down by the user before the last disconnection.

The redirection control unit 604 is configured to send, to the client, the metadata that is acquired by the metadata reading unit 603 and of the multimedia instance that is not shut down by the user before the last disconnection so that the client creates the player and the decoder according to the type of the multimedia file and the audio/video encoding format of the multimedia file; the redirection control unit 604 further sends, to the client, the multimedia data corresponding to the multimedia instance that is not shut down so that the client decodes the multimedia data by using the decoder and plays the decoded multimedia data in the player on the client.

As can be seen from the above, if the technical solution in this embodiment is applied, when or before a user is disconnected, the multimedia server 600 automatically stores, in the storage unit 602, information related to a multimedia instance that is not shut down by the user before the disconnection; therefore, when the receiving unit 601 receives a login request from the user to log in to a virtual-desktop service again, the metadata reading unit 603 of the server 600 may acquire, according to an identifier of the user and in combination with information stored in the storage unit 602, metadata of the multimedia instance that is not shut down by the user before the last disconnection (the metadata at least includes information about a type of a multimedia file corresponding to the multimedia instance that is not shut down before the last disconnection, and an audio/video encoding format of the multimedia file), and the redirection control unit 604 of the server 600 sends the metadata to a client, so as to restore, at the client, creation of a decoding topological structure and a player corresponding to the multimedia instance; in addition, the server sends, to the client, multimedia data of the multimedia instance that is not shut down so that after receiving the multimedia data, the client may use the created decoding topological structure to perform data decoding, and then play the multimedia data in the player. In this way, the client can play the multimedia instance that is not shut down by the user before the last disconnection.

In the prior art, if restoration of multimedia redirection fails and multimedia data fails to be obtained when a user logs in again after interruption unexpectedly occurs in a last login, a problem such as a blank or a black screen occurs in a client. In contrast, when the technical solution in this embodiment of the present invention is applied, it helps to ensure that when a user logs in again, the server 600 locally stores data corresponding to a multimedia instance that is not shut down by the user before a last disconnection so that metadata of the multimedia instance that is not shut down by the user before the last disconnection can be acquired when the user logs in again, and the server 600 automatically pushes, to a client, multimedia data and the metadata of the multimedia instance that is not shut down by the user before the last disconnection, so as to ensure that the user can locally resume playing of multimedia being played during the last disconnection, thereby implementing continuous playing of the multimedia without the occurrence of a situation such as a white screen or a black screen, and helping to significantly improve experience of multimedia application of the user.

This embodiment is especially applicable to the following application scenario: in a multimedia redirection process, after the server 600 acquires multimedia data of a multimedia instance, the server 600 actively pushes the multimedia data to a client, and the client performs data processing such as decoding on the received multimedia data and then performs multimedia playing.

Embodiment 7

Figure 8:
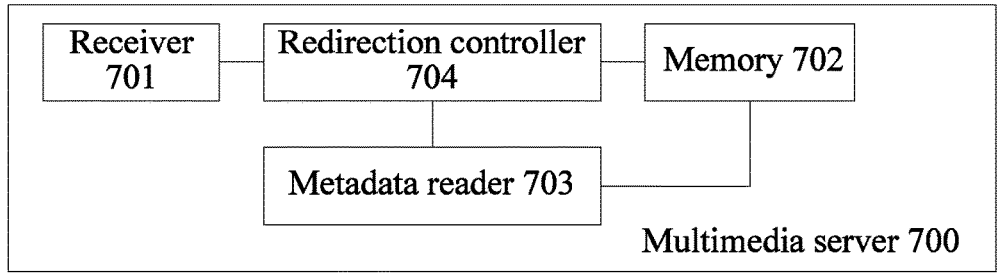
FIG. 8 is a schematic structural diagram of a multimedia server according to Embodiment 7 of the present invention.

Referring to FIG. 8, this embodiment provides a multimedia server 700, which mainly includes a receiver 701, a memory 702, a metadata reader 703, and a redirection controller 704. Connection relationships and working principles of these parts are as follows.

The receiver 701 is configured to receive a virtual-desktop login request of a user, where the virtual-desktop login request includes an identifier of the user. For the working principle, reference may be made to step 101 in Embodiment 1, step S213 in Embodiment 2, and Step S313 in Embodiment 3, but the working principle is not limited thereto.

The memory 702 is electrically connected to the metadata reader 703 and the redirection controller 704. The memory 702 stores information about a multimedia instance that is not shut down by the user before a last disconnection. The information about the multimedia instance may include a web page identifier of a web page on which the multimedia instance is located, or is specifically metadata of the multimedia instance, where the metadata at least includes path information of a multimedia file corresponding to the multimedia instance. For details, refer to corresponding records of 102 in Embodiment 1, steps S26 and S36 in Embodiments 2 and 3, and the like.

The metadata reader 703 is in a circuit connection to the memory 702 and the redirection controller 704, and is configured to read, according to the identifier of the user in the virtual-desktop login request received by the receiver 701, the metadata that is acquired by the memory 702 and of the multimedia instance that is not shut down by the user before the last disconnection.

When the information that is stored in the memory 702 and about the multimedia instance that is not shut down before the last disconnection is specifically the web page identifier of the web page on which the multimedia instance that is not shut down by the user before the last disconnection is located, the metadata reader 703 is configured to perform a query on the memory 702 according to the identifier of the user to acquire the web page identifier of the web page on which the multimedia instance that is not shut down by the user before the last disconnection is located; and according to the web page identifier, refresh the web page, load the web page again, and acquire the metadata of the multimedia instance on the web page.

When the information that is stored in the memory 702 and about the multimedia instance that is not shut down before the last disconnection is specifically the metadata of the multimedia instance that is not shut down by the user before the last disconnection, the metadata reader 703 is configured to perform a query on the memory 702 according to the identifier of the user to acquire the metadata of the multimedia instance that is not shut down by the user before the last disconnection.

The metadata that is stored in the memory 702 and of each multimedia instance at least includes path information of a multimedia file corresponding to each multimedia instance so that a client acquires, after receiving the metadata, the multimedia file, and reads the multimedia file to obtain multimedia data.

The metadata that is stored in the memory 702 and of each multimedia instance may further include information about a playing window of the multimedia instance, a size of the playing window, a position of the playing window on a virtual desktop of the server, and a position of a covered region of the playing window on the virtual desktop. Therefore, after receiving the metadata sent by the server, the client creates the playing window according to the information about the playing window included in the received metadata of the multimedia instance, and plays the multimedia data in the created playing window. Therefore, experience of multimedia application of the user is further improved.

For a detailed working principle, refer to records of step 102 in Embodiment 1, and steps S215 and S315 in Embodiments 2 and 3.

The redirection controller 704 is electrically connected to the receiver 701, the memory 702, and the metadata reader separately, and is configured to control the work of each part as follows: when the receiver 701 receives the virtual-desktop login request of the user, the redirection controller 704 controls the metadata reader 703 to read the memory 702; the metadata reader 703 acquires by means of reading, according to the information that is in the memory 702 and about the multimedia instance that is not shut down before the last disconnection, the metadata corresponding to the user; after the metadata reader 703 acquires, by means of reading, the metadata corresponding to the user, the redirection controller 704 sends, according to the metadata obtained by the metadata reader 703, the metadata to the client of the user so that the client acquires, according to the metadata, the multimedia data corresponding to the metadata, and plays the multimedia data at the client. For a more detailed working principle, refer to the records of step 103 in Embodiment 1 and steps S216 and S217 and steps S316 and S317 in Embodiments 2 and 3.

As can be seen from the above, if the technical solution in this embodiment is applied, before a user is disconnected, the multimedia server 700 in this embodiment automatically stores information related to a multimedia instance that is not shut down by the user before the disconnection; therefore, when the receiver 701 receives a login request from the user to log in to a virtual-desktop service again, the metadata reader 703 of the server 700 acquires, according to an identifier of the user and information that is stored in the memory 702, metadata of the multimedia instance that is not shut down by the user before the last disconnection (the metadata at least includes path information of a multimedia file corresponding to the multimedia instance) so that the redirection controller 704 of the server 700 actively sends the metadata to a client, so as to enable the client to restore a multimedia redirection process, acquire, according to the metadata, multimedia data corresponding to the metadata, and play the multimedia data at the client. In the prior art, if restoration of multimedia redirection fails and multimedia data fails to be obtained when a user logs in again after interruption unexpectedly occurs in a last login, a problem such as a blank or a black screen occurs in a client. In contrast, when the technical solution in this embodiment of the present invention is applied, it helps to ensure that when a user logs in again, the server 700 automatically pushes, to a client, metadata of a multimedia instance that is not shut down by the user before a last disconnection, and ensure that the client may acquire, according to the metadata, multimedia data of the multimedia instance that is not shut down before the last disconnection, so as to ensure that the user can locally resume playing of multimedia being played during the last disconnection, thereby implementing continuous playing of the multimedia without the occurrence of a situation such as a white screen or a black screen, and helping to significantly improve experience of multimedia application of the user.

In addition to the path information of the multimedia file corresponding to the multimedia instance, the metadata stored in the multimedia instance memory 702 in this embodiment may further include, as shown in Embodiment 3, position information of the playing window of the multimedia instance on the virtual desktop of the server 700, and position information of the covered region of the playing window on the virtual desktop.

Assuming that a current multimedia instance is a flash instance, in metadata of the flash instance, path information of a multimedia file corresponding to the multimedia instance includes: path information of a flash media file (for example, a flash file of an swf type) corresponding to the flash instance, and path information of a flash stream media file (for example, a flash file of an flv type) corresponding to the flash instance.

Embodiment 8

Figure 9:
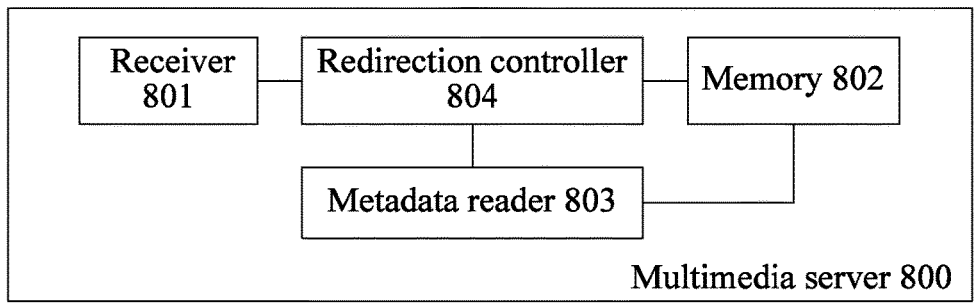
FIG. 9 is a schematic structural diagram of a multimedia server according to Embodiment 8 of the present invention.

Referring to FIG. 9, this embodiment provides a multimedia server 800, which mainly includes a receiver 801, a memory 802, a metadata reader 803, and a redirection controller 804. Connection relationships and working principles of these parts are as follows.

The receiver 801 is configured to receive a virtual-desktop login request of a user, where the virtual-desktop login request includes an identifier of the user. For the working principle, reference may be made to step 101 in Embodiment 1, step S213 in Embodiment 2, and Step S313 in Embodiment 3, but the working principle is not limited thereto.

The memory 802 is electrically connected to the metadata reader 803 and the redirection controller 804, and the memory 802 stores metadata of a multimedia instance that is not shut down by the user before a last disconnection.

The metadata that is stored in the memory 802 and of the multimedia instance at least includes: a type of a multimedia file corresponding to the multimedia instance and an audio/video encoding format of the multimedia file; therefore, after the redirection controller 804 sends, to a client, the metadata of the multimedia instance that is not shut down by the user before the last disconnection, the client may create a player and a decoder according to the type of the multimedia file and the audio/video encoding format of the multimedia file, and the client decodes, after receiving multimedia data pushed by the server, the multimedia data by using the decoder on the client, and plays the decoded multimedia data in the player.

The metadata reader 803 is in a circuit connection to the memory 802 and the redirection controller 804, and is configured to perform a query on the memory 802 according to the identifier of the user in the virtual-desktop login request received by the receiver 801, and acquire by means of reading, from the memory 802, the metadata of the multimedia instance that is not shut down by the user before the last disconnection.

The redirection controller 804 is configured to send, to the client, the metadata that is acquired by the metadata reader 803 and of the multimedia instance that is not shut down by the user before the last disconnection so that the client creates the player and the decoder according to the type of the multimedia file and the audio/video encoding format of the multimedia file; the redirection controller 804 further sends, to the client, the multimedia data corresponding to the multimedia instance that is not shut down so that the client decodes the multimedia data by using the decoder and plays the decoded multimedia data in the player on the client.

As can be seen from the above, if the technical solution in this embodiment is applied, when or before a user is disconnected, the multimedia server 800 automatically stores, in the memory 802, information related to a multimedia instance that is not shut down by the user before the disconnection; therefore, when the receiver 801 receives a login request from the user to log in to a virtual-desktop service again, the metadata reader 803 of the server 800 may acquire, according to an identifier of the user and in combination with information stored in the memory 802, metadata of the multimedia instance that is not shut down by the user before the last disconnection (the metadata at least includes information about a type of a multimedia file corresponding to the multimedia instance that is not shut down before the last disconnection, and an audio/video encoding format of the multimedia file), and the redirection controller 804 of the server 800 sends the metadata to a client, so as to restore, at the client, creation of a decoding topological structure and a player corresponding to the multimedia instance; in addition, the server sends, to the client, multimedia data of the multimedia instance that is not shut down so that after receiving the multimedia data, the client may use the created decoding topological structure to perform data decoding, and then play the multimedia data in the player. In this way, the client can play the multimedia instance that is not shut down by the user before the last disconnection.

In the prior art, if restoration of multimedia redirection fails and multimedia data fails to be obtained when a user logs in again after interruption unexpectedly occurs in a last login, a problem such as a blank or a black screen occurs in a client. In contrast, when the technical solution in this embodiment of the present invention is applied, it helps to ensure that when a user logs in again, the server 800 locally stores data corresponding to a multimedia instance that is not shut down by the user before a last disconnection so that metadata of the multimedia instance that is not shut down by the user before the last disconnection can be acquired when the user logs in again, and the server 800 automatically pushes, to a client, multimedia data and the metadata of the multimedia instance that is not shut down by the user before the last disconnection, so as to ensure that the user can locally resume playing of multimedia being played during the last disconnection, thereby implementing continuous playing of the multimedia without the occurrence of a situation such as a white screen or a black screen, and helping to significantly improve experience of multimedia application of the user.

This embodiment is especially applicable to the following application scenario: in a multimedia redirection process, after the server 800 acquires multimedia data of a multimedia instance, the server 800 actively pushes the multimedia data to a client, and the client performs data processing such as decoding on the received multimedia data and then performs multimedia playing.

Embodiment 9

Figure 10:
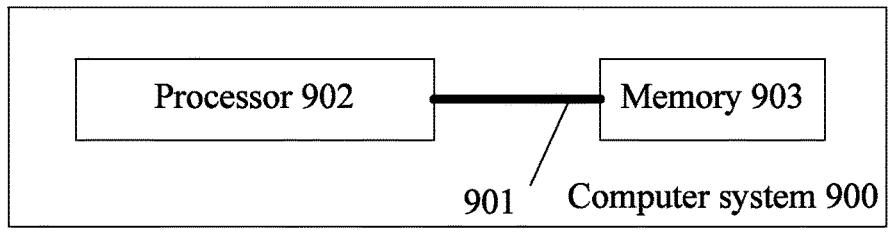
FIG. 10 is a schematic structural diagram of a computer system installable to a multimedia server according to Embodiment 9 of the present invention.

This embodiment provides a computer system 900, as shown in FIG. 10, which may be configured at any computer. The computer system 900 mainly includes a communications line 901, a processor 902, and a memory 903. The processor 902 is connected to the memory 903 by means of the communications line.

The processor 902 invokes, by means of the communications line 901, code stored in the memory 903 to execute the following control: after a virtual-desktop login request of a user is received, acquiring, according to an identifier of the user included in the virtual-desktop login request, metadata of a multimedia instance that is not shut down by the user before a last disconnection, where the metadata at least includes path information of a multimedia file corresponding to the multimedia instance; and sending the metadata to a client of the user so that the client acquires, according to the metadata, multimedia data corresponding to the metadata and plays the multimedia data.

For a more detailed working principle, reference may be made to those in Embodiments 1 to 3 and 5, but the working principle is not limited thereto.

As can be seen from the above, if the technical solution in this embodiment is applied, during a disconnection of a user, a server to which the computer system 900 is installed automatically stores information related to a multimedia instance that is not shut down by the user before the disconnection; therefore, when the user logs in to a virtual-desktop service again, the server may acquire, according to an identifier of the user, metadata of the multimedia instance that is not shut down by the user before the last disconnection (the metadata at least includes path information of a multimedia file corresponding to the multimedia instance), and the server sends the metadata to a client so that the client acquires, according to the metadata, multimedia data corresponding to the metadata, and plays the multimedia data at the client.

In the prior art, if restoration of multimedia redirection fails and multimedia data fails to be obtained when a user logs in again after interruption unexpectedly occurs in a last login, a problem such as a blank or a black screen occurs in a client. In contrast, when the technical solution in this embodiment of the present invention is applied, it helps to ensure that when a user logs in again, a server automatically pushes, to a client, metadata of a multimedia instance that is not shut down by the user before a last disconnection, and ensure that the client may acquire, according to the metadata, multimedia data of the multimedia instance that is not shut down before the last disconnection, so as to ensure that the user can locally resume playing of multimedia being played during the last disconnection, thereby implementing continuous playing of the multimedia without the occurrence of a situation such as a white screen or a black screen, and helping to significantly improve experience of multimedia application of the user.

Embodiment 10

Figure 11:
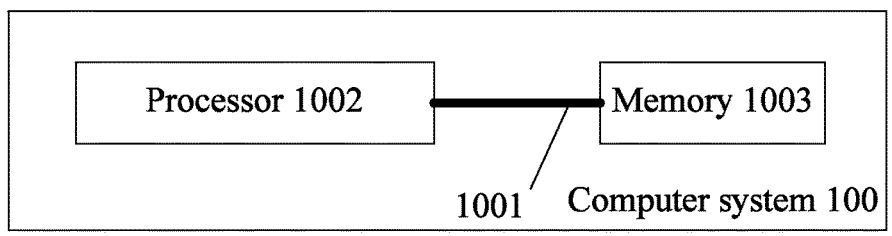
FIG. 11 is a schematic structural diagram of a computer system installable to a multimedia server according to Embodiment 10 of the present invention.

This embodiment provides a computer system 100, as shown in FIG. 11, which may be configured at any computer.

The computer system mainly includes a communications line 1001, a processor 1002, and a memory 1003. The processor 1002 is connected to the memory 1003 by means of the communications line 1001.

The processor 1002 invokes, by means of the communications line, code stored in the memory 1003 to execute the following control: after a virtual-desktop login request of a user is received, acquiring, according to an identifier of the user included in the virtual-desktop login request, metadata of a multimedia instance that is not shut down by the user before a last disconnection, where the metadata at least includes a type of a multimedia file corresponding to the multimedia instance and an audio/video encoding format of the multimedia file; sending the metadata to a client so that the client creates a player and a decoder according to the type of the multimedia file and the audio/video encoding format of the multimedia file; and pushing multimedia data corresponding to the multimedia instance that is not shut down to the client so that the client decodes the multimedia data by using the decoder and plays the decoded multimedia data in the player.

For a more detailed working principle, reference may be made to those in Embodiments 4 and 6, but the working principle is not limited thereto.

As can be seen from the above, if the technical solution in this embodiment is applied, during a disconnection of a user, a server to which the computer system 100 is installed automatically stores metadata of a multimedia instance that is not shut down by the user before the disconnection; therefore, when the user logs in to a virtual-desktop service again, the server may acquire, according to an identifier of the user, the metadata of the multimedia instance that is not shut down by the user before the last disconnection (the metadata at least includes information about a type of a multimedia file corresponding to the multimedia instance that is not shut down before the last disconnection, and an audio/video encoding format of the multimedia file) so that the server sends the metadata to a client, so as to restore, at the client, creation of a decoding topological structure and a player corresponding to the multimedia instance; in addition, the server sends, to the client, multimedia data of the multimedia instance that is not shut down so that after receiving the multimedia data, the client may use the created decoding topological structure to perform data decoding, and then play the multimedia data in the player. In this way, the client can play the multimedia instance that is not shut down by the user before the last disconnection.

In the prior art, if restoration of multimedia redirection fails and multimedia data fails to be obtained when a user logs in again after interruption unexpectedly occurs in a last login, a problem such as a blank or a black screen occurs in a client. In contrast, when the technical solution in this embodiment of the present invention is applied, it helps to ensure that when a user logs in again, a server locally stores data corresponding to a multimedia instance that is not shut down by the user before a last disconnection so that metadata of the multimedia instance that is not shut down by the user before the last disconnection can be acquired when the user logs in again, and the server automatically pushes, to a client, multimedia data and the metadata of the multimedia instance that is not shut down by the user before the last disconnection, so as to ensure that the user can locally resume playing of multimedia being played during the last disconnection, thereby implementing continuous playing of the multimedia without the occurrence of a situation such as a white screen or a black screen, and helping to significantly improve experience of multimedia application of the user.

This embodiment is especially applicable to the following application scenario: in a multimedia redirection process, after a server acquires multimedia data of a multimedia instance, the server actively pushes the multimedia data to a client, and the client performs data processing such as decoding on the received multimedia data and then performs multimedia playing.

In Embodiments 9 and 10, the communications line between the memory and the processor may be, but is not limited to, a bus or another communications wire. The communications wire may be, but is not limited to being, implemented by an integrated circuit.

The described apparatus embodiment is merely exemplary. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments. A person of ordinary skill in the art may understand and implement the embodiments of the present invention without creative efforts.

Based on the foregoing descriptions of the embodiments, a person skilled in the art may clearly understand that each implementation manner may be implemented by software in addition to a necessary general hardware platform or by hardware. Based on such an understanding, the foregoing technical solutions essentially or the part contributing to the prior art may be implemented in a form of a software product. The software product is stored in a computer readable storage medium, such as a read only memory (ROM)/random access memory (RAM), a hard disk, or an optical disc, and includes several instructions for instructing a computer device (which may be a personal computer, a server, a network device, or the like) to perform the methods described in the embodiments or some parts of the embodiments.

The foregoing implementation manners are not intended to limit the protection scope of the technical solutions. Any modification, equivalent replacement, and improvement made without departing from the spirit and principle of the foregoing implementation manners shall fall within the protection scope of the technical solutions.

What is claimed is:

1. A multimedia redirection method, comprising:
   establishing a connection between a client of a user and a server;
   providing, by the server, a virtual-desktop service to the user;
   storing, by the server, information of a multimedia instance for the user before disconnection between the client of the user and the server;
   receiving, by the server, a virtual-desktop login request from the client of the user, wherein the virtual-desktop login request is used to rebuild the connection between the client of the user and the server, and wherein the virtual-desktop login request comprises an identifier of the user;
   determining, by the server and according to the identifier of the user, the existence of the multimedia instance that is not shut down by the user before the disconnection between the client of the user and the server;
   acquiring, by the server and according to the identifier of the user, metadata of the multimedia instance that is not shut down by the user before the disconnection between the client of the user and the server, wherein the metadata of the multimedia instance corresponds to the information of the multimedia instance and comprises path information of a multimedia file corresponding to the multimedia instance; and sending, by the server, the metadata to the client of the user, wherein the metadata is used by the client to acquire, according to the metadata, multimedia data of the multimedia instance corresponding to the metadata and play the multimedia data, wherein the multimedia instance is a flash instance, and wherein the path information of the multimedia file corresponding to the multimedia instance comprises path information of a flash media file corresponding to the flash instance.

2. The multimedia redirection method according to claim 1, wherein the information of the multimedia instance is a web page identifier of a web page on which the multimedia instance is located, and wherein acquiring metadata of the multimedia instance that is not shut down by the user before the disconnection between the client of the user and the server comprises:

acquiring, according to the identifier of the user, the web page identifier of the web page on which the multimedia instance that is not shut down by the user before the disconnection between the client of the user and the server is located;

refreshing the web page according to the web page identifier;

loading the web page again according to the web page identifier; and acquiring the metadata of the multimedia instance on the web page according to the web page identifier.

3. The multimedia redirection method according to claim 1, wherein the information of the multimedia instance is the metadata of the multimedia instance, and wherein acquiring metadata of the multimedia instance that is not shut down by the user before the disconnection between the client of the user and the server comprises performing, according to the identifier of the user, a query to acquire pre-stored metadata of the multimedia instance that is not shut down by the user before the disconnection between the client of the user and the server.

4. The multimedia redirection method according to claim 1, wherein the metadata of the multimedia instance further comprises a plurality of playing window parameters, wherein the playing window parameters comprise at least one of a size of a playing window of the multimedia instance, a position of the playing window on a virtual desktop of a server, or a position of a covered region of the playing window on the virtual desktop, and wherein playing the multimedia data comprises:

creating, by the client according to the playing window parameters, the playing window at the client; and playing the multimedia data in the playing window.

5. A multimedia redirection method, comprising:

establishing a connection between a client of a user and a server;

providing, by the server, a virtual-desktop service to the user;

storing, by the server, metadata of a multimedia instance for the user before disconnection between the client of the user and the server;

receiving, by the server, a virtual-desktop login request from the client of the user, wherein the virtual-desktop login request is used to rebuild the connection between the client of the user and the server, and wherein the virtual-desktop login request comprises an identifier of the user;

determining, by the server and according to the identifier of the user, the existence of the multimedia instance that is not shut down by the user before the disconnection between the client of the user and the server;

acquiring, by the server and according to the identifier of the user, metadata of the multimedia instance that is not shut down by the user before the disconnection between the client of the user and the server, wherein the metadata comprises a type of a multimedia file corresponding to the multimedia instance and at least one of an audio encoding format of the multimedia file or a video encoding format of the multimedia file;

sending, by the server, the metadata of the multimedia instance to the client of the user, wherein the type of the multimedia file and at least one of an audio encoding format of the multimedia file or a video encoding format of the multimedia file are used by the client to create a player and a decoder; and pushing, by the server, multimedia data corresponding to the multimedia instance that is not shut down to the client, wherein the multimedia data is decoded by the client using the decoder and played by the client using the player, wherein the multimedia instance is a flash instance, and wherein the path information of the multimedia file corresponding to the multimedia instance comprises path information of a flash media file corresponding to the flash instance.

6. The multimedia redirection method according to claim 5, wherein the metadata of the multimedia instance further comprise a plurality of playing window parameters, wherein the playing window parameters comprise at least one of a size of the playing window, a position of the playing window on a virtual desktop of a server, or a position of a covered region of the playing window on the virtual desktop, wherein the method further comprises creating, by the client and according to the type of the multimedia file and the at least one of an audio encoding format of the multimedia file or the video encoding format of the multimedia file, the player at the client so that a playing window of the player and the playing window in the metadata have consistent information.

7. A multimedia server for providing virtual-desktop service to a user, comprising:

a processor configured to establish a connection between a client of a user and a server;

a memory coupled to the processor and configured to store information of a multimedia instance for the user before disconnection between the client of the user and the server;

a receiver coupled to the processor and configured to receive a virtual-desktop login request from the client of the user, wherein the virtual-desktop login request is used to rebuild the connection between the client of the user and the server, wherein the virtual-desktop login request comprises an identifier of the user, and wherein the processor is further configured to:

determine, according to the identifier of the user, the existence of the multimedia instance that is not shut down by the user before the disconnection between the client of the user and the server; and acquire, according to the identifier of the user, metadata of the multimedia instance that is not shut down by the user before the last disconnection, wherein the metadata of the multimedia instance corresponds to the information of the multimedia instance and comprises path information of a multimedia file corresponding to the multimedia instance; and a transmitter coupled to the processor and configured to send the metadata of the multimedia instance to the client of the user, wherein the metadata is used by the client to acquire, according to the metadata, multimedia data of the multimedia instance corresponding to the metadata and play the multimedia data, wherein the multimedia instance is a flash instance, and wherein the path information of the multimedia file corresponding to the multimedia instance comprises path information of a flash media file corresponding to the flash instance.

8. The multimedia server according to claim 7, wherein the information of the multimedia instance is a web page identifier of a web page on which the multimedia instance is located, and wherein the processor is further configured to:

perform a query on the memory according to the identifier of the user to acquire the web page identifier of the web page on which the multimedia instance that is not shut down by the user before the disconnection between the client of the user and the server is located; and refresh the web page according to the web page identifier;

load the web page again according to the web page identifier; and acquire the metadata of the multimedia instance on the web page after the web page is loaded.

9. The multimedia server according to claim 7, wherein the information of the multimedia instance is the metadata of the multimedia instance, and wherein the processor is further configured to perform a query on the memory according to the identifier of the user to acquire the metadata of the multimedia instance that is not shut down by the user before the disconnection between the client of the user and the server.

10. The multimedia server according to claim 9, wherein the metadata about the multimedia instance further comprises a size of the playing window, a position of the playing window on a virtual desktop of the server, and a position of a covered region of the playing window on the virtual desktop.

11. A multimedia server for providing virtual-desktop service to a user, comprising:

a processor configured to establish a connection between a client of the user and a server;

a memory coupled to the processor and configured to store metadata of a multimedia instance for the user before disconnection between the client of the user and the server, wherein the metadata of the multimedia instance comprises a type of a multimedia file corresponding to the multimedia instance and at least one of an audio encoding format of the multimedia file or a video encoding format of the multimedia file;

a receiver coupled to the processor and configured to receive a virtual-desktop login request from the client of the user, wherein the virtual-desktop login request is used to rebuild the connection between the client of the user and the server, wherein the virtual-desktop login request comprises an identifier of the user, and wherein the processor is further configured to perform a query on the memory according to the identifier of the user to acquire the metadata of the multimedia instance that is not shut down by the user before the disconnection between the client of the user and the server; and a transmitter coupled to the processor and configured to:

send the metadata of the multimedia instance to the client; and push multimedia data corresponding to the multimedia instance that is not shut down to the client, wherein the type of the multimedia file and at least one of the audio encoding format of the multimedia file or the video encoding format of the multimedia file are used by the client to create a player and a decoder, wherein the multimedia data is decoded by the client using the decoder and played by the client using the player, wherein the multimedia instance is a flash instance, and wherein the path information of the multimedia file corresponding to the multimedia instance comprises path information of a flash media file corresponding to the flash instance.

12. The multimedia server according to claim 11, wherein the metadata that is stored in the memory and of the multimedia instance further comprises a size of the playing window, a position of the playing window On a virtual desktop of the server, and a position of a covered region of the playing window on the virtual desktop.

13. A computer system, comprising:

a processor connected to a communications line; and a memory coupled to the processor, wherein the processor is configured to invoke code stored in the memory to:

establish a connection between a client of a user and a server;

provide a virtual-desktop service to the user;

store information of a multimedia instance for the user before disconnection between the client of the user and the server;

receive a virtual-desktop login request from the client of the user, wherein the virtual-desktop login request is used to rebuild the connection between the client of the user and the server, and wherein the virtual-desktop login request comprises an identifier of the user;

determine, according to the identifier of the user, the existence of the multimedia instance that is not shut down by the user before the disconnection between the client of the user and the server;

acquire, according to the identifier of the user comprised in the virtual-desktop login request, metadata of the multimedia instance that is not shut down by the user before the disconnection between the client of the user and the server, wherein the metadata of the multimedia instance corresponds to the stored information of the multimedia instance and comprises path information of a multimedia file corresponding to the multimedia instance; and send the metadata to the client of the user, wherein the metadata is used by the client to acquire, according to the metadata, multimedia data of the multimedia instance corresponding to the metadata and the multimedia data, wherein the multimedia instance is a flash instance, and wherein the path information of the multimedia file corresponding to the multimedia instance comprises path information of a flash media file corresponding to the flash instance.

14. A computer system, comprising:

a processor; and a memory coupled to the processor, wherein the processor invokes code stored in the memory to:

establish a connection between a client of a user and a server;

provide a virtual-desktop service to the user;

store metadata of a multimedia instance for the user before disconnection between the client of the user and the server;

receive a virtual-desktop login request from the client of the user, wherein the virtual-desktop login request is used to rebuild the connection between the client of the user and the server, and wherein the virtual-desktop login request comprises an identifier of the user;

determine, according to the identifier of the user, the existence of the multimedia instance that is not shut down by the user before the disconnection between the client of the user and the server;

acquire, according to the identifier of the user comprised in the virtual-desktop login request, metadata of the multimedia instance that is not shut down by the user before the disconnection between the client of the user and the server, wherein the metadata comprises a type of a multimedia file corresponding to the multimedia instance and at least one of an audio encoding format of the multimedia file or a video encoding format of the multimedia file;

send the metadata of the multimedia instance to the client of the user, wherein the type of the multimedia file and the audio encoding format of the multimedia file are used by the client to create a player and a decoder; and push multimedia data corresponding to the multimedia instance that is not shut down to the client, wherein the multimedia data is decoded by the client using the decoder and played by the client using the player, wherein the multimedia instance is a flash instance, and wherein the path information of the multimedia file corresponding to the multimedia instance comprises path information of a flash media file corresponding to the flash instance.

15. A multimedia redirection method, comprising:

establishing a connection between a client of a user and a server;

providing, by the server, a virtual-desktop service to the user;

storing, by the server, information of a multimedia instance for the user before disconnection between the client of the user and the server;

receiving, by the server, a virtual-desktop login request from the client of the user, wherein the virtual-desktop login request is used to rebuild the connection between the client of the user and the server, and wherein the virtual-desktop login request comprises an identifier of the user;

determining, by the server and according to the identifier of the user, the existence of the multimedia instance that is not shut down by the user before the disconnection between the client of the user and the server;

acquiring, by the server and according to the identifier of the user, metadata of the multimedia instance that is not shut down by the user before the disconnection between the client of the user and the server, wherein the metadata of the multimedia instance corresponds to the information of the multimedia instance and comprises path information of a multimedia file corresponding to the multimedia instance; and sending, by the server, the metadata to the client of the user, wherein the metadata is used by the client to acquire, according to the metadata, multimedia data of the multimedia instance corresponding to the metadata and play the multimedia data, wherein the multimedia instance is a flash instance, and wherein the path information of the multimedia file corresponding to the multimedia instance comprises path information of a flash stream media file corresponding to the flash instance.

16. A multimedia redirection method, comprising:

establishing a connection between a client of a user and a server;

providing, by the server, a virtual-desktop service to the user;

storing, by the server, metadata of a multimedia instance for the user before disconnection between the client of the user and the server;

receiving, by the server, a virtual-desktop login request from the client of the user, wherein the virtual-desktop login request is used to rebuild the connection between the client of the user and the server, and wherein the virtual-desktop login request comprises an identifier of the user;

determining, by the server and according to the identifier of the user, the existence of the multimedia instance that is not shut down by the user before the disconnection between the client of the user and the server;

acquiring, by the server and according to the identifier of the user, metadata of the multimedia instance that is not shut down by the user before the disconnection between the client of the user and the server, wherein the metadata comprises a type of a multimedia file corresponding to the multimedia instance and at least one of an audio encoding format of the multimedia file or a video encoding format of the multimedia file;

sending, by the server, the metadata of the multimedia instance to the client of the user, wherein the type of the multimedia file and at least one of an audio encoding foiinat of the multimedia file or a video encoding format of the multimedia file are used by the client to create a player and a decoder; and pushing, by the server, multimedia data corresponding to the multimedia instance that is not shut down to the client, wherein the multimedia data is decoded by the client using the decoder and played by the client using the player, wherein the multimedia instance is a flash instance, and wherein the path information of the multimedia file corresponding to the multimedia instance comprises path information of a flash stream media file corresponding to the flash instance.

17. A computer system, comprising:

a processor connected to a communications line; and a memory coupled to the processor, wherein the processor is configured to invoke code stored in the memory to:

establish a connection between a client of a user and a server;

provide a virtual-desktop service to the user;

store information of a multimedia instance for the user before disconnection between the client of the user and the server;

receive a virtual-desktop login request from the client of the user, wherein the virtual-desktop login request is used to rebuild the connection between the client of the user and the server, and wherein the virtual-desktop login request comprises an identifier of the user;

determine, according to the identifier of the user, the existence of the multimedia instance that is not shut down by the user before the disconnection between the client of the user and the server;

acquire, according to the identifier of the user comprised in the virtual-desktop login request, metadata of the multimedia instance that is not shut down by the user before the disconnection between the client of the user and the server, wherein the metadata of the multimedia instance corresponds to the stored information of the multimedia instance and comprises path information of a multimedia file corresponding to the multimedia instance; and send the metadata to the client of the user, wherein the metadata is used by the client to acquire, according to the metadata, multimedia data of the multimedia instance corresponding to the metadata and play the multimedia data, wherein the multimedia instance is a flash instance, and wherein the path information of the multimedia file corresponding to the multimedia instance comprises path infotniation of a flash stream media file corresponding to the flash instance.

18. A computer system, comprising:
a processor; and
a memory coupled to the processor,
wherein the processor invokes code stored in the memory to:
establish a connection between a client of a user and a server;
provide a virtual-desktop service to the user;
store metadata of a multimedia instance for the user before disconnection between the client of the user and the server;

receive a virtual-desktop login request from the client of the user, wherein the virtual-desktop login request is used to rebuild the connection between the client of the user and the server, and wherein the virtual-desktop login request comprises an identifier of the user;

determine, according to the identifier of the user, the existence of the multimedia instance that is not shut down by the user before the disconnection between the client of the user and the server;

acquire, according to the identifier of the user comprised in the virtual-desktop login request, metadata of the multimedia instance that is not shut down by the user before the disconnection between the client of the user and the server, wherein the metadata comprises a type of a multimedia file corresponding to the multimedia instance and at least one of an audio encoding format of the multimedia file or a video encoding format of the multimedia file;

send the metadata of the multimedia instance to the client of the user, wherein the type of the multimedia file and the audio encoding format of the multimedia file are used by the client to create a player and a decoder; and push multimedia data corresponding to the multimedia instance that is not shut down to the client, wherein the multimedia data is decoded by the client using the decoder and played by the client using the player, wherein the multimedia instance is a flash instance, and wherein the path information of the multimedia file corresponding to the multimedia instance comprises path information of a flash stream media file corresponding to the flash instance.

* * * * *